(12) United States Patent
Dechant

(10) Patent No.: US 11,990,860 B2
(45) Date of Patent: May 21, 2024

(54) DRIVE ARRANGEMENT

(71) Applicant: SCHLETTER INTERNATIONAL B.V., Amsterdam (NL)

(72) Inventor: Gabriel Dechant, Gstadt am Chiemsee (DE)

(73) Assignee: SCHLETTER INTERNATIONAL B.V., Amsterdam (NL)

( * ) Notice: Subject to any disclaimer, the term of this patent is extended or adjusted under 35 U.S.C. 154(b) by 800 days.

(21) Appl. No.: 17/040,812

(22) PCT Filed: Mar. 7, 2019

(86) PCT No.: PCT/EP2019/055690
§ 371 (c)(1),
(2) Date: Sep. 23, 2020

(87) PCT Pub. No.: WO2019/179781
PCT Pub. Date: Sep. 26, 2019

(65) Prior Publication Data
US 2021/0058025 A1    Feb. 25, 2021

(30) Foreign Application Priority Data
Mar. 23, 2018   (DE) ...................... 10 2018 002 460.2

(51) Int. Cl.
*F24S 30/425*   (2018.01)
*H02S 20/32*    (2014.01)
*F24S 30/00*    (2018.01)

(52) U.S. Cl.
CPC ............ *H02S 20/32* (2014.12); *F24S 30/425* (2018.05); *F24S 2030/11* (2018.05); *F24S 2030/136* (2018.05)

(58) Field of Classification Search
CPC .. F16H 2019/046; F16H 19/043; F16H 19/04; F16H 27/06; F24S 2030/115; F24S 2030/11; F24S 2030/133; F24S 2030/134
See application file for complete search history.

(56) References Cited

U.S. PATENT DOCUMENTS

| 2,618,187 A | 11/1952 | Shaff et al. |
| 3,597,559 A | 8/1971 | Van Riemsdijk |

(Continued)

FOREIGN PATENT DOCUMENTS

| DE | 328666 C | 11/1920 |
| DE | 2908122 A1 | 9/1979 |

(Continued)

OTHER PUBLICATIONS

Office Action issued by the European Patent Office for European Patent Application No. 19711839.1-1002, dated Jul. 19, 2021.

(Continued)

*Primary Examiner* — Gregory Robert Weber
(74) *Attorney, Agent, or Firm* — Bradley Arant Boult Cummings, LLP; Henry B. Ward, III

(57) ABSTRACT

A drive arrangement is provided comprising at least one drive device, which is rotatable about a rotational axis, comprises at least one drive element and at least one retaining element, the drive element being arranged offset in the radial direction in relation to the retaining element, and at least one output unit, which is rotatable or pivotable about an axis, the output unit comprising at least one drive recess and at least one retaining recess, the drive element being associated with the at least one drive recess and engaging in the drive recess to drive the output unit, and the retaining element being associated with the retaining recess and engaging in the retaining recess to hold the output unit in a set position, the drive element having a cross section that is different from a circular cross section and that is curved at (Continued)

least in some sections, and/or the drive recess widening in the radial direction in order to define an entry opening for the drive element.

17 Claims, 34 Drawing Sheets

(56) References Cited

U.S. PATENT DOCUMENTS

| | | | |
|---|---|---|---|
| 3,818,747 A | 6/1974 | Van Riemsdijk | |
| 4,224,263 A * | 9/1980 | Kontz | B29C 49/56 425/526 |
| 4,606,235 A | 8/1986 | Kindt | |
| 2008/0066985 A1 * | 3/2008 | Cheng | F16H 27/06 180/220 |
| 2011/0240007 A1 | 10/2011 | Currier | |
| 2016/0365830 A1 | 12/2016 | Bailey et al. | |
| 2017/0149375 A1 | 5/2017 | Bailey | |
| 2018/0073773 A1 | 3/2018 | Grushkowitz | |
| 2018/0091088 A1 * | 3/2018 | Barton | F24S 30/425 |

FOREIGN PATENT DOCUMENTS

| | | |
|---|---|---|
| DE | 102014209939 A1 | 11/2015 |
| DE | 202018103053 U1 | 7/2018 |
| WO | 7900930 A1 | 11/1979 |
| WO | 2018009634 A1 | 1/2018 |

OTHER PUBLICATIONS

Office Action issued by the European Patent Office for European Patent Application No. 19711839.1-1002, dated Nov. 11, 2022.
Office Action issued by the European Patent Office for European Patent Application No. 19711839.1-1002, dated Aug. 1, 2023.
Office Action issued by the European Patent Office for European Patent Application No. 18 712 905.1, dated Jul. 7, 2023.

* cited by examiner

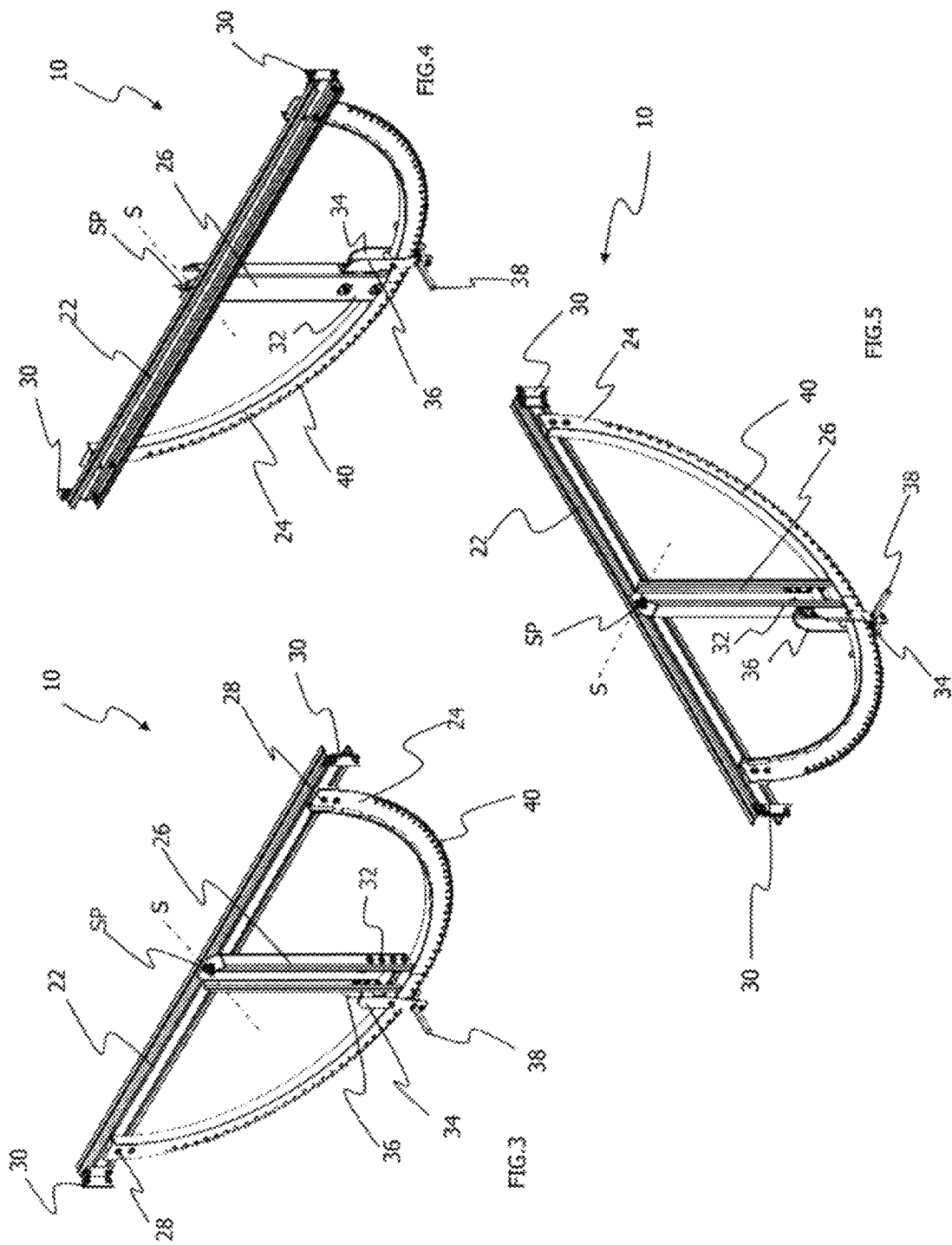

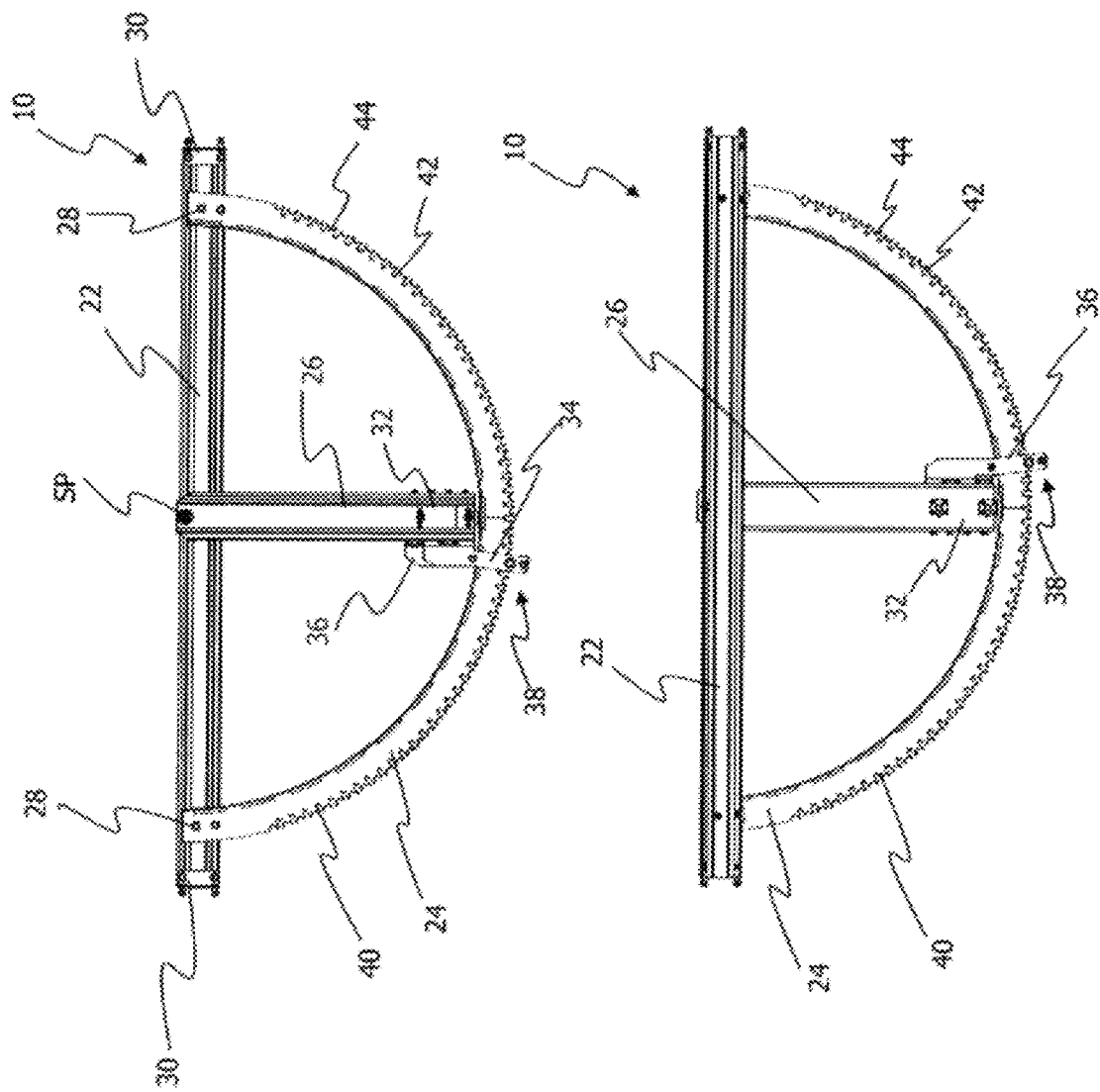

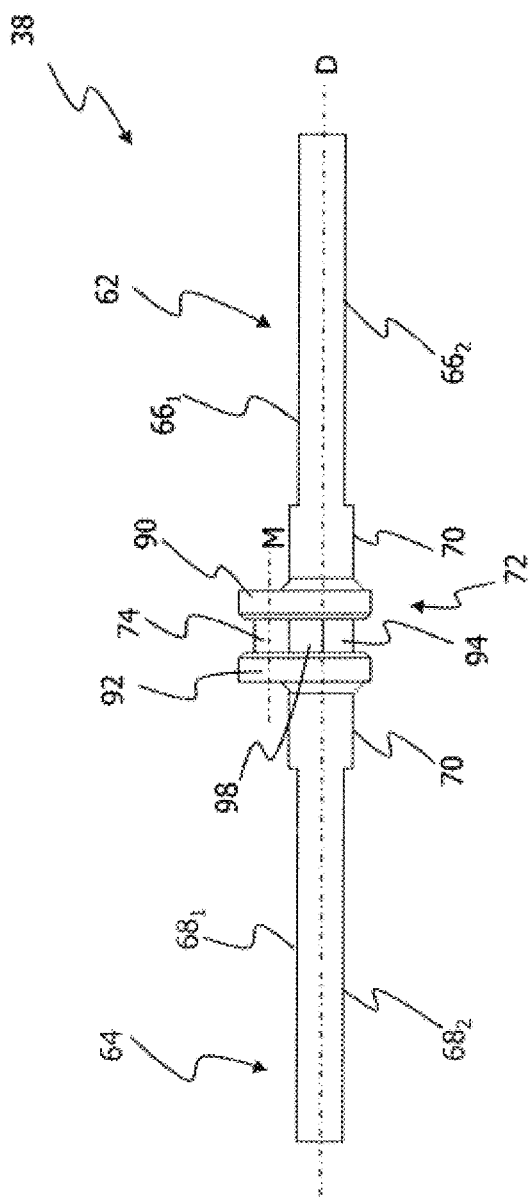
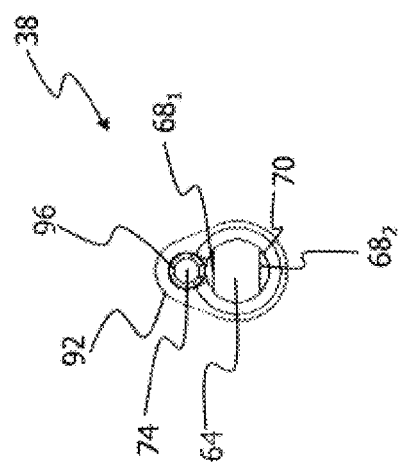
FIG.16
FIG.17

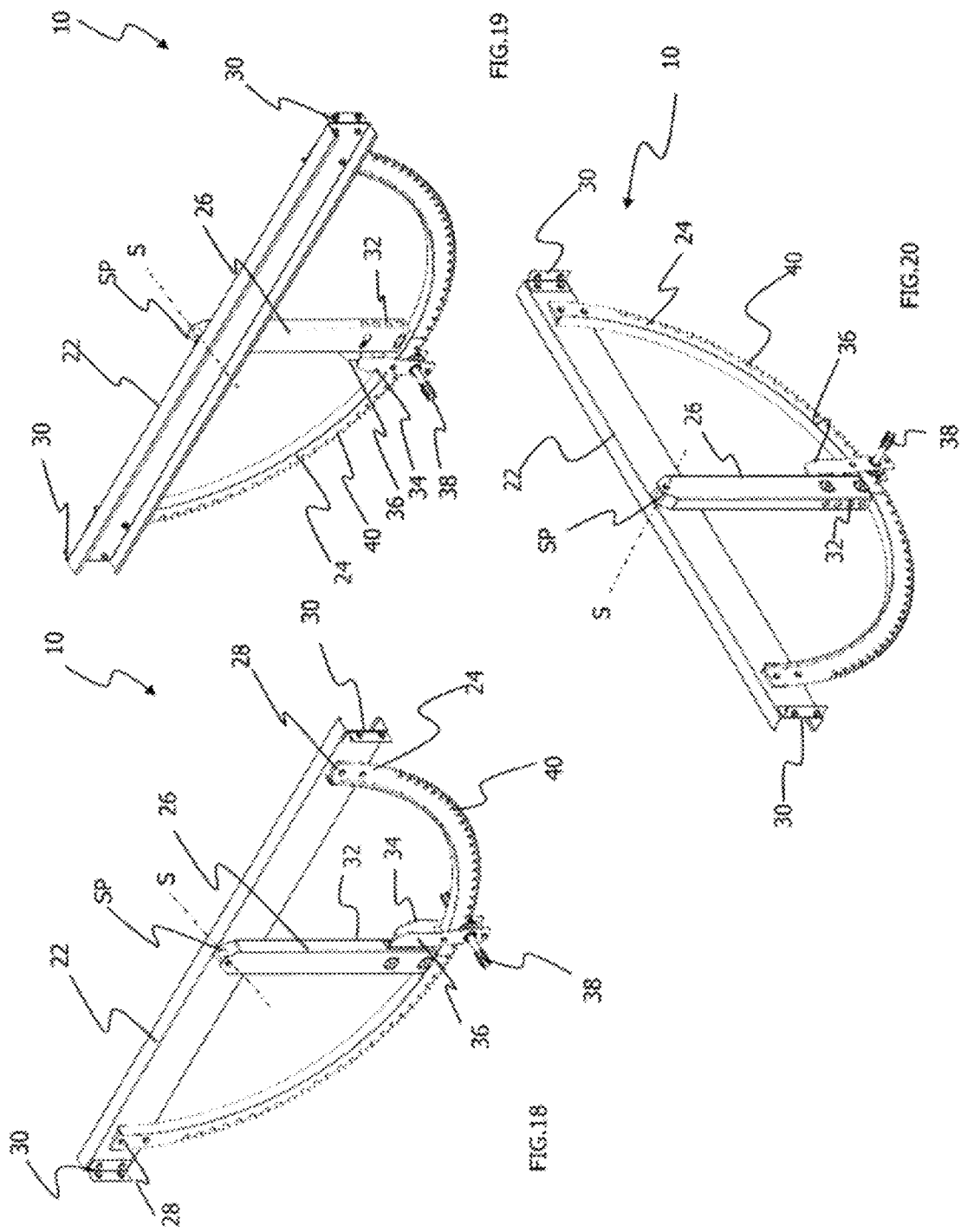

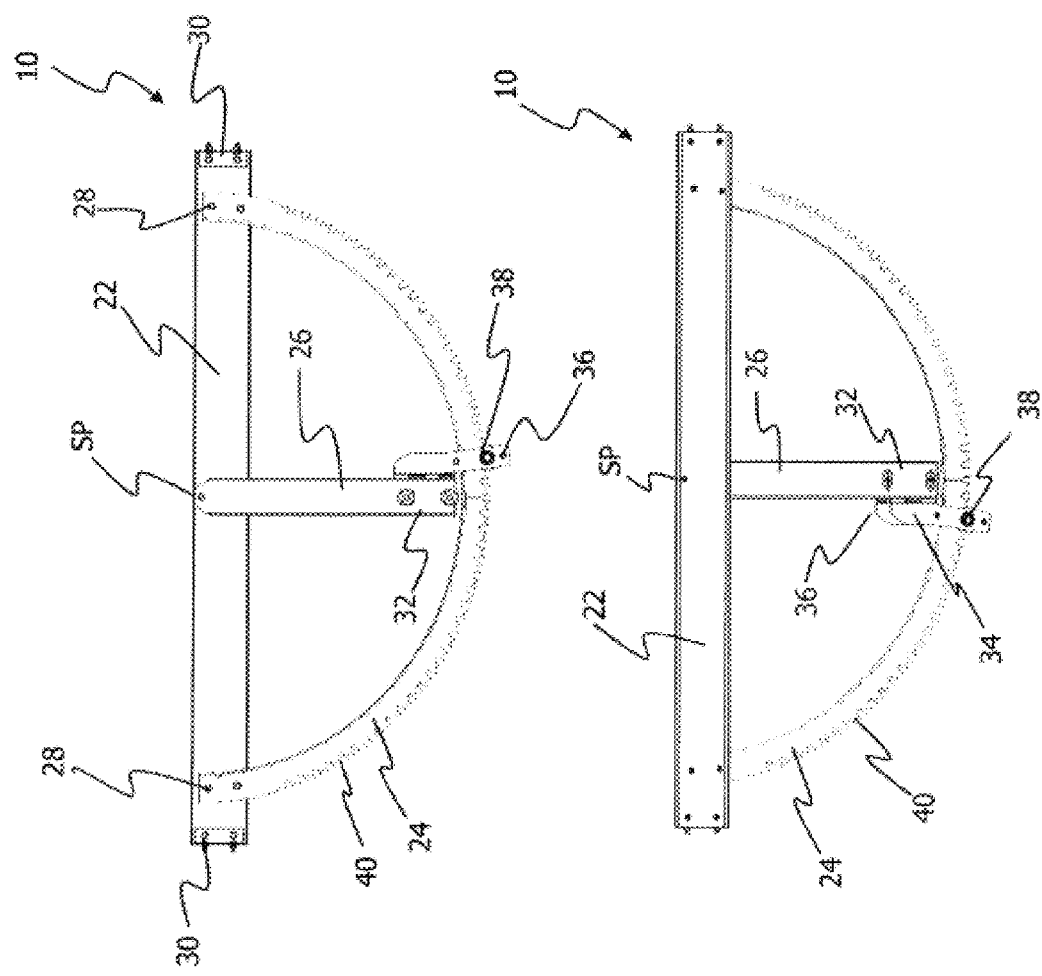

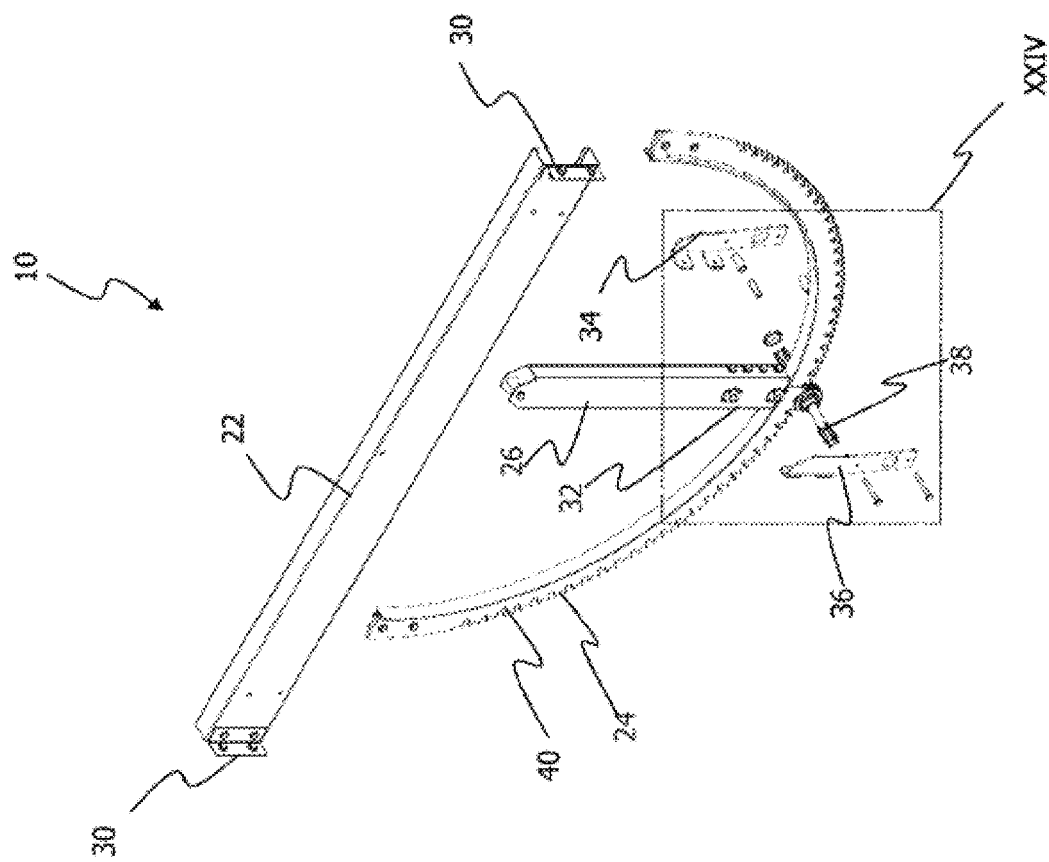

DRIVE ARRANGEMENT

FIELD OF THE INVENTION

The present invention relates to a drive arrangement for driving at least one output unit that can be displaced about a rotation or pivot axis.

BACKGROUND OF THE INVENTION

Such drive arrangements comprise a drive device and an output unit. The drive device is brought into engagement with the output unit in order to transmit a torque to the output unit. Such drive arrangements are often referred to as Maltese cross gears or "Geneva drives."

BRIEF SUMMARY OF THE INVENTION

An object of the present invention is to provide an improved drive arrangement with which the function of the drive arrangement can be ensured in the long term, for example given reduced precision of the arrangement or given increased contamination.

This object is achieved with a drive arrangement having the features of comprising at least one drive device, which is rotatable about a rotation axis, comprises at least one drive element and at least one retaining element, the at least one drive element being arranged offset in the radial direction in relation to the at least one retaining element, the at least one drive element comprising a longitudinal axis that extends parallel and offset in the radial direction to the rotation axis of the at least one drive device. The drive arrangement further comprising at least one output unit, which is rotatable or pivotable about an axis, the output unit comprising at least one drive recess and at least one retaining recess. The at least one drive element being associated with the at least one drive recess and engaging in the at least one drive recess in order to drive the output unit. The at least one retaining element being associated with the at least one retaining recess and engaging in the at least one retaining recess in order to hold the output unit in a set position. The at least one drive element having a cross section that is different from a circular cross section and that is curved at least in some sections, the at least one drive element having at least one selected from the group comprising (1) a cross section reduced in the radial direction with respect to the rotation axis compared to a circular cross section, and (2) the at least one drive recess widening in the radial direction in order to define an entry opening for the at least one drive element.

According to further embodiments, the cross section of the at least one drive element comprises at least one first apex and at least one second apex, the distance between which defines the greatest extent of the drive element, or the cross section of the at least one drive element comprises at least one first edge and at least one second edge, the distance between which defines the greatest extent of the drive element. In another embodiment, the cross section of the at least one drive element has at least one third apex and one fourth apex, the distance between which is smaller than the distance between the first apex or the first edge and the second apex or the second edge. In another embodiment, the at least one drive recess widens outward or inward in the radial direction in order to define the entry opening for the at least one drive element. In another embodiment, the rotation axis of the drive device runs through or along the at least one retaining element. In another embodiment, the at least one retaining element has at least in one portion a curvature that is matched to the curvature of the at least one retaining recess. In another embodiment, the at least one drive element and the at least one retaining element are connected to one another via at least one connecting element. In another embodiment, the at least one drive element and the at least one retaining element extend substantially parallel to the rotation axis of the drive device. In yet another embodiment, the at least one drive element has an oval or elliptical or lenticular or circular cross section.

The drive arrangement according to the invention for driving at least one output unit that is displaceable about an axis comprises at least one drive device that is rotatable about a rotation axis and that comprises at least one drive element and at least one retaining element. The at least one drive element is arranged offset in the radial direction in relation to the at least one retaining element. The drive arrangement further comprises at least one output unit, the output unit comprising at least one drive recess and at least one retaining recess. The at least one drive element is associated with the at least one drive recess and engages in the at least one drive recess in order to drive the output unit. The at least one retaining element is associated with the at least one retaining recess and engages in the at least one retaining recess in order to hold the output unit in a set position. The at least one drive element has a cross section that is different from a circular cross section and that is curved at least in some sections, and/or the at least one drive recess widens in the radial direction in order to define an entry opening for the at least one drive element.

According to the invention, the drive device and the output unit are designed in such a way that the function of the drive arrangement can be permanently guaranteed. In particular, the torque-transmitting engagement between the at least one drive recess and the at least drive element can be ensured even if there is an increase in the distance between the drive device and the output unit due to manufacturing tolerances, assembly tolerances and/or elastic deformations of the drive device and/or the output unit. In addition, the functionality of the drive arrangement may also be maintained if the drive device and/or the output unit are contaminated. Such an increase in the distance, in particular the radial distance between the drive device and the output unit, may lead to tangential displacement between the drive device and the output unit, which can impair or even prevent the engagement of the at least one drive element in the at least one drive recess. In other words, the "threading" or the engagement of the at least one drive element in the at least one drive recess can be ensured even if the described increase in the radial distance or tangential displacement between the drive device and the output unit occurs.

By engaging the at least one drive element in the at least one drive recess, the drive device and the output unit are coupled in a torque-transmitting manner in such a way that, when the drive device is rotated, a stepwise rotary or adjustment movement of the output unit about its rotation or pivot axis may occur. A continuous rotary movement of the drive device about the rotation axis can accordingly lead to a stepwise rotary or adjustment movement of the output unit. The rotary or adjustment movement of the output unit is always carried out when the at least one drive element is engaged with the at least one drive recess. When the drive device rotates, the at least one drive element may engage in the associated drive recess of the output unit, take the output unit with it and then leave the drive recess again. Between the engagement of the drive element in the drive recess and the leaving of the drive recess, the at least one drive element presses against a wall of the drive recess, as a result of which torque is exerted on the output unit, which leads to a rotary or adjustment movement of the output unit.

The at least one retaining element always engages in the at least one retaining recess of the output unit when the at least one drive element is not engaged with the at least one drive recess of the output unit. The at least one retaining element can positively engage in the at least one retaining recess. In this state, the output unit can be held in its set position. The drive arrangement is thus in a locked position. In the locked position, the output unit is prevented from rotating about its rotation or pivot axis. Due to the rotary movement of the drive device having the at least one retaining element, the at least one retaining element initially engages with a portion in the at least one associated retaining recess of the output unit, this section continuously increasing due to the rotary movement of the drive device. After a predetermined angle of rotation is executed, the retaining element can leave the at least one retaining recess. As soon as the at least one retaining element even partially engages in the retaining recess, rotation of the output unit about its rotation or pivot axis may be prevented.

If the drive device is driven further, the retaining element and the drive element continue to rotate so that the drive element can be brought into engagement with the next drive recess. For example, the drive element can be rotated by 90° to 270° about the rotation axis of the drive arrangement after emerging from a drive recess in order to engage with the next drive recess. At the same time, the at least one retaining element rotates further in the retaining recess and leaves the retaining recess when or shortly after the drive element engages in the next drive recess. The at least one retaining element thus releases the output unit for the next adjustment step.

The at least one drive element may have a cross section having at least one curved portion that contacts a wall of the at least one drive recess in order to drive the at least one output unit. The at least one drive element may comprise a reduced cross section in the radial direction with respect to the rotation axis of the drive device.

The cross section of the at least one drive element may comprise at least one first apex and at least one second apex. The distance between the first apex and the second apex defines the greatest extent of the drive element. The cross section of the at least one drive element may have its greatest extent in a direction transverse to the radial direction of the drive device. Alternatively, the cross section of the at least one drive element may comprise at least one first edge and at least one second edge, the distance between which defines the greatest extent of the drive element. If two edges are provided on the cross section of the drive element, the cross section of the drive element may comprise two curved portions that extend between the two edges. If the cross section of the drive element comprises two apexes, the cross section is also curved in the region of the apexes. The cross section of the drive element may thus have a plurality of radii of curvature. The radius of curvature in the region of the apexes may differ from the radius of curvature of the portion between the two apexes.

The cross section of the at least one drive element may comprise at least one third apex and at least one fourth apex. The distance between the third apex and the fourth apex may be smaller than the distance between the first apex or the first edge and the second apex or the second edge. The third apex and the fourth apex can be in alignment in the radial direction of the drive device. The distance between the first apex and the second apex may be matched to the size of the drive recess in order to achieve a guided movement of the at least one drive element in the drive recess when the output unit is displaced about its rotation or pivot axis.

The distance between the third apex and the fourth apex, which is smaller than the distance between the first apex and the second apex, may compensate for tangential displacements between the drive device and the output unit, which may occur due to tolerances, so that the engagement of the at least one drive element in the associated drive recess may be ensured. The size of a radial clearance between the at least one retaining element and the at least one drive element may be determined, among other things, via the distance between the third or fourth apex, that is to say, via the cross section of the drive element that is reduced in the radial direction, which radial clearance may support the alternate engagement of the drive element and the retaining element in the associated drive recesses and retaining recesses.

The at least one drive recess may widen outward in the radial direction in order to define an entry opening for the at least one drive element. By widening the drive recess outward in the radial direction, the entry opening of the drive recess may be enlarged for the penetration or engagement of the drive element. The distance between two opposite flanks of the at least one drive recess may increase outward in the radial direction. If the at least one drive recess is directed radially inward, the at least one drive recess may widen inward in the radial direction. This applies in particular if the drive device is arranged radially within the output unit.

The rotation axis of the drive device may run through or along the at least one retaining element. The at least one retaining element has a curved outer surface. The curvature of the outer surface of the retaining element is matched to the curvature of the at least one retaining recess such that the at least one retaining element can penetrate into the at least one retaining recess and rotate in the retaining recess. As soon as the at least one retaining element penetrates into the at least one retaining recess, rotation of the output unit about its rotation or pivot axis may be prevented. The at least one retaining element may have at least in one portion a curvature that is matched to the curvature of the at least one retaining recess. The radius of curvature of the curved portion of the retaining element can be matched to the radius of curvature of the wall of the at least one retaining recess.

The at least one drive element and the at least one retaining element may be connected to one another via at least one connecting element. The connecting element may extend in the radial direction. The connecting element may be disk-shaped or cam-shaped, for example. The at least one connecting element may also be connected to at least one coupling portion, via which the at least one connecting element may be coupled to a drive. The coupling to the drive may be made directly or indirectly via other components.

The at least one drive element and the at least one retaining element may extend parallel to the rotation axis of the drive device. The drive recesses and the retaining recesses may be designed to correspond to the shape or the cross section of the drive element and the retaining element. The at least one drive element may have an oval or elliptical or lenticular or circular cross section.

BRIEF DESCRIPTION OF THE SEVERAL VIEWS OF THE DRAWING

Exemplary embodiments of the present invention are described below with reference to the attached figures. In the figures:

FIGS. 3 to 7 show different views of a pivot unit according to a first embodiment;

FIGS. 15 to 17 show different views of a drive device of the pivot unit shown in FIGS. 3 to 11;

FIGS. 18 to 22 show different views of a pivot unit according to a second embodiment of the invention;

FIG. 23 shows an exploded view of the pivot unit shown in FIGS. 18 to 22;

DETAILED DESCRIPTION OF THE INVENTION

Figure 1:
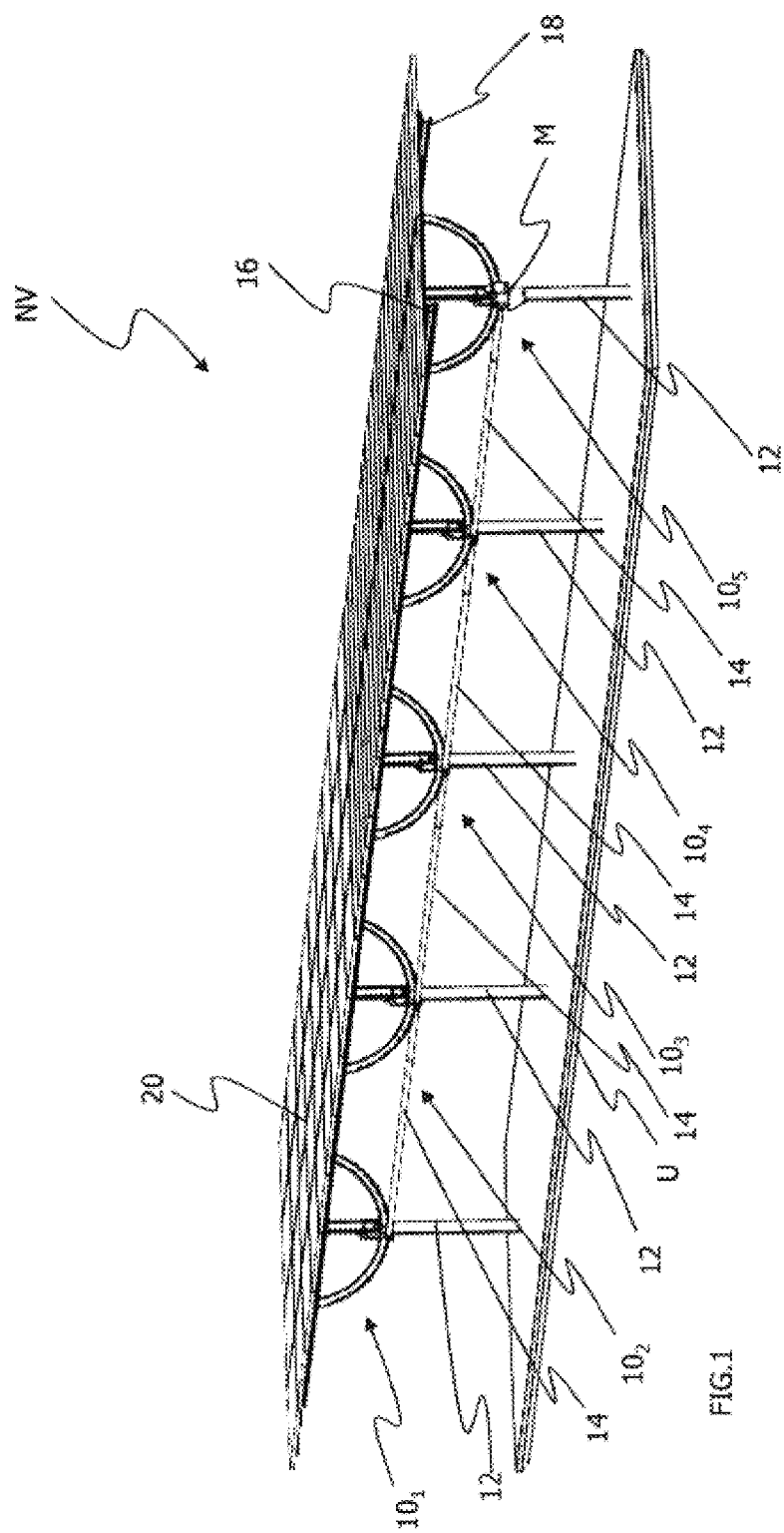
FIGS. 1 and 2 show perspective views of a tracking system for solar modules according to one embodiment.

FIG. 1 shows a perspective view of a tracking apparatus for solar modules. The tracking apparatus is generally designated with NV. The tracking apparatus NV has a plurality of pivot units $10_1$ to $10_5$. Each of the pivot units $10_1$ to $10_5$ is connected to a post 12 anchored to the ground U. The pivot units $10_1$ to $10_5$ are interconnected via the drive shafts 14. The drive shafts 14 are driven by a motor M, which in FIG. 1 is arranged on the pivot unit $10_5$. In this way, a plurality of pivot units $10_1$ to $10_5$ may be driven using a single drive. The pivot units $10_1$ to $10_5$ are also interconnected via mounting rails 16 and 18, to which solar modules 20 may be attached with the aid of fastening elements. To align the solar modules 20 with the sun, the pivot units $10_1$ to $10_5$ are driven via the drive shafts 14, as a result of which the pivot units $10_1$ to $10_5$ may pivot the solar modules 20 attached to them.

Figure 2:
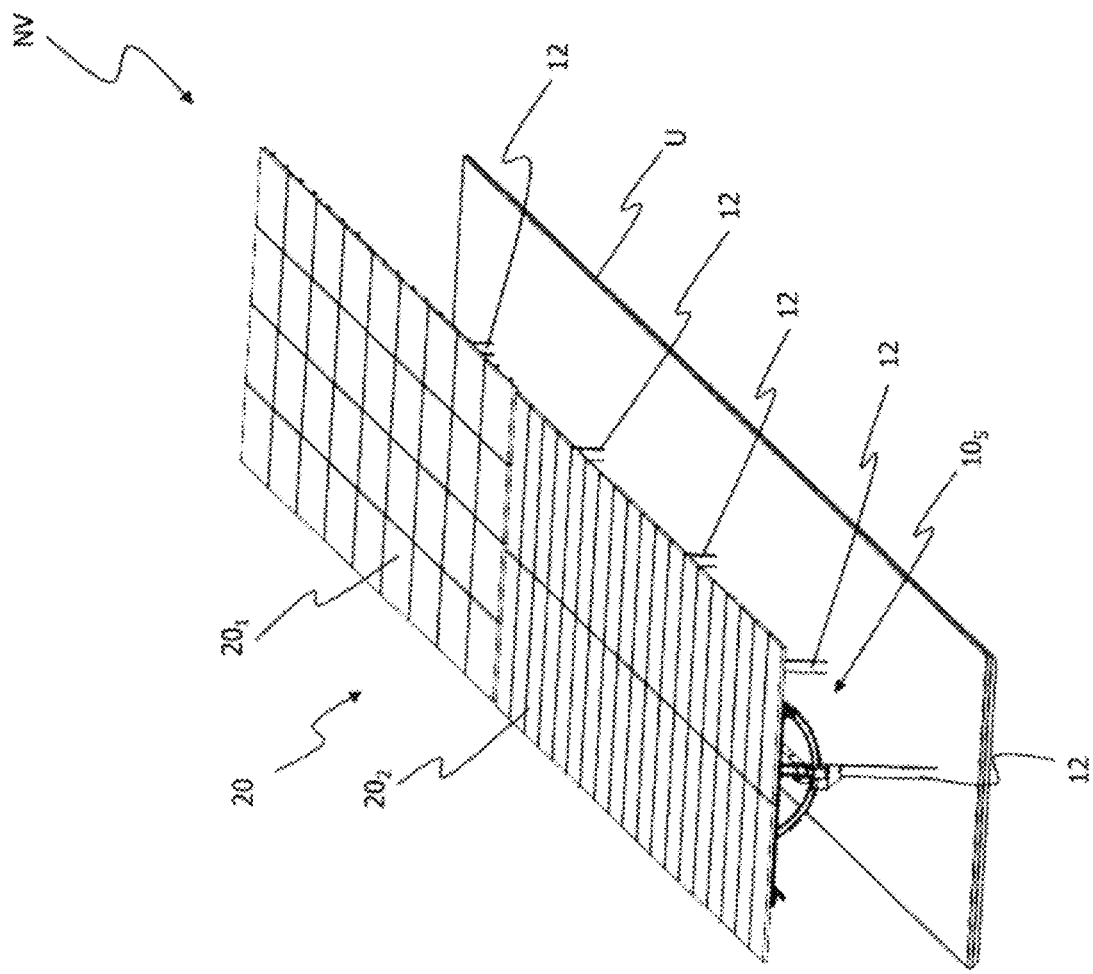

FIG. 2 shows a further perspective view of the tracking apparatus NV in which the solar modules 20 and the pivot unit $10_5$ arranged on a post 12 and the posts 12 of the further pivot units $10_1$ to $10_4$ are shown. Solar modules 20 with different shapes, sizes, orientations and also solar modules 20 of different types of construction may be attached to the tracking apparatus NV, as illustrated in FIG. 2 by the differently illustrated solar modules $20_1$ and $20_2$.

FIGS. 3 to 5 show different perspective views of a pivot unit 10 according to a first embodiment. The pivot unit 10 comprises a cross member 22, a drive arc 24 attached to the cross member 22 and a support element 26.

The cross member 22 and the support element 26 are pivotally connected to each other. A pivot axis S extends through the cross member 22 and the support element 26. The pivot axis S extends through the pivot point SP formed at the connection point between the cross member 22 and the support element 26.

The drive arc 24 is connected to the cross member 22 via fastening means 28 such as screws or bolts. Connecting elements 30 can be seen at the ends of the cross member 22. The cross member 22 may be connected to the mounting rails 16 and 18 shown in FIG. 1 via the connecting elements 30.

The support element 26 may be connected with its end 32 opposite the pivot axis S to a post 12 that may be anchored in or on the ground (see FIG. 1). Fastening elements 34 and 36 are also attached to the end 32 of the support element 26. A drive device 38 is connected to the support element 26 via the fastening elements 34 and 36. The drive device 38 serves to pivot into a new pivot position and to hold the drive arc 24 in a set position. The drive arc may be pivoted stepwise. For this purpose, the drive device 38 engages with a drive contour 40 on the drive arc 24. The drive contour 40 is formed on the outside of the drive arc 24 in the radial direction. The drive device 38 and the drive arc 24 form a drive arrangement.

FIGS. 6 and 7 show two views of the pivot unit 10 from opposite viewing directions. FIGS. 6 and 7 show the cross member 22, the drive arc 24 and the support element 26. In the starting position or the assembly position of the pivot unit 10, that is to say, the cross member 22 has not been pivoted about the pivot point SP relative to the support element 26, the support element 26 extends perpendicular to the cross member 22. The pivot point SP is formed in the middle of the cross member 22. At the ends of the cross member 22, the connecting elements 30 are shown, which serve to connect the cross member 22 to the mounting rails 16 and 18 (see FIG. 1).

The fastening elements 34 and 36 are connected to the support element 26 at the end 32 of the support element 26, which is opposite the pivot point SP. The drive device 38 is rotatably mounted on the fastening elements 34 and 36. The fastening elements 34 and 36 hold the drive device 38 on the support element 26. The drive device 38 is in engagement with the drive contour 40 on the drive arc 24. The drive contour 40 comprises two different types of recesses. The drive contour 40 comprises drive recesses 42 and retaining recesses 44 that are arranged alternately in the direction of the circumference of the drive arc 24. When the drive device 38 engages in the drive recesses 42, the drive arc 24 and the cross member 22 connected thereto are moved. If the drive device 38 engages in the retaining recesses 44, the drive arc 24 and the cross member 22 connected thereto may be held in their set position. The drive device 38 may also change its position in engagement with one of the retaining recesses 44 in order to be able to engage in the next drive recess 42. No torsional load is transmitted to the drive shaft 14. The drive contour 40 and the drive device 38 will be discussed in more detail later in this description.

Figure 8:
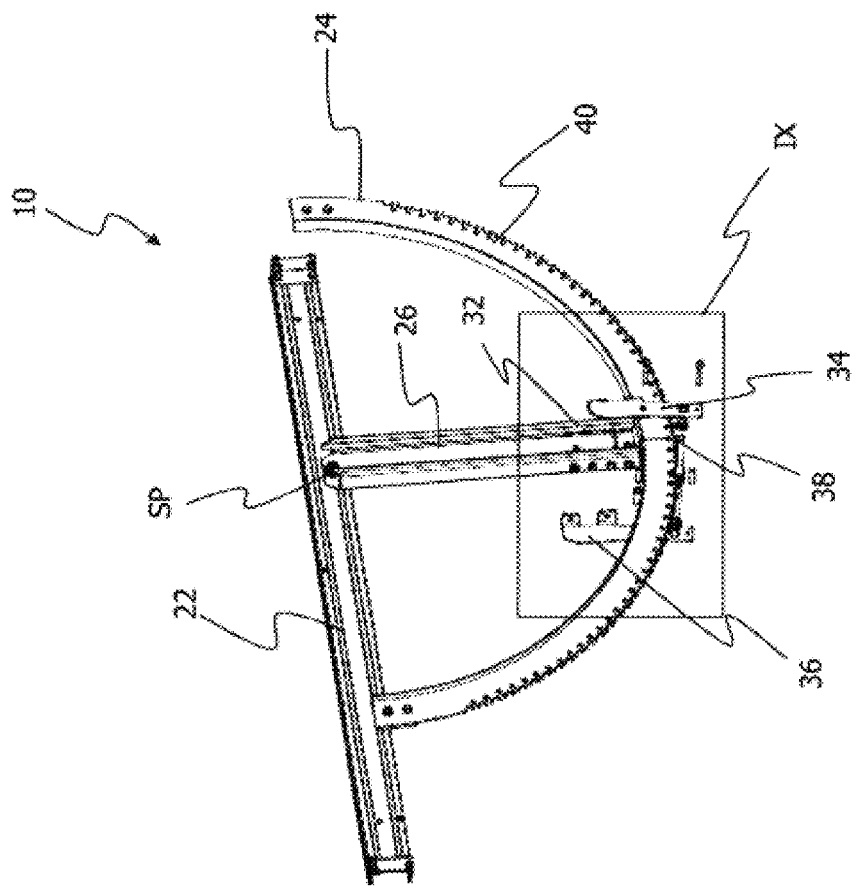
FIG. 8 shows an exploded view of the pivot unit shown in FIGS. 3 to 7.

FIG. 8 shows an exploded perspective view of the pivot unit 10. FIG. 8 shows the cross member 22, the drive arc 24, the support element 26, the drive device 38 and the two fastening elements 34 and 36.

Figure 9:
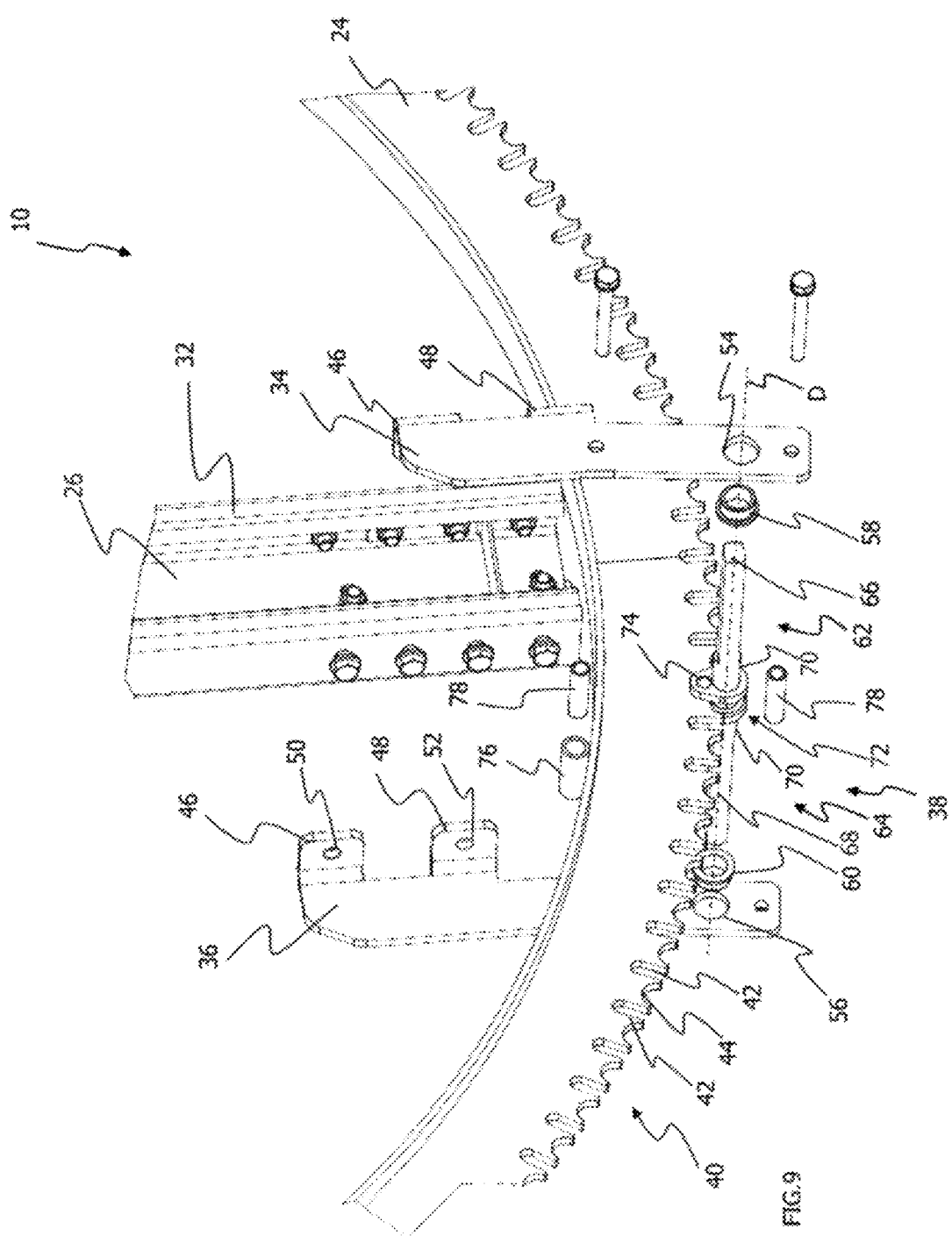
FIG. 9 shows an enlarged view of the section marked IX in FIG. 8.

FIG. 9 shows an enlarged view of the detail marked IX in FIG. 8. FIG. 9 shows the end 32 of the support element 26, the two fastening elements 34 and 36 and a portion of the drive arc 24.

The fastening elements 34 and 36 each have two fastening sections 46 and 48. The fastening sections 46 and 48 are angled to the main body of the fastening elements 34 and 36. Each fastening section 46 and 48 has an opening 50, 52. The openings 50, 52 can only be seen on the fastening element 36 in FIG. 9. With these fastening sections 46 and 48, the fastening elements 34 and 36 are connected to the support element 26.

The fastening elements 34 and 36 each have a bearing opening 54 and 56 in which the drive device 38 may be mounted. Bearing bushings 58 and 60 are provided for mounting the drive device 38 in the openings 54 and 56 and are accommodated in the openings 54 and 56. The drive device 38 comprises two coupling elements 62 and 64. The coupling elements 62 and 64 are rod-shaped. The coupling elements 62 and 64 may be accommodated in sections in the openings 54, 56 or in bearing bushings 58, 60 arranged in the openings 54, 56. The coupling elements 62 and 64 each have a coupling portion 66, 68 and a bearing portion 70. The coupling portions 66 and 68 are provided with a cross section that is suitable for coupling to a drive shaft 14 (see FIG. 1). The drive portion 72 of the drive device 38, in which drive portion the drive element 74 is provided, is formed between the coupling elements 62 and 64. The drive element 74 engages in the drive contour 40 of the drive arc 24. A retaining element, is which is not shown in FIG. 9, is provided in the drive portion 72. The retaining element will be discussed in detail later in this description.

The pivot unit 10 has a guide element 76 that forms a guide device for the radial guidance of the drive arc 24. The drive arc 24 may be supported in the radial direction on the guide element 76. The guide element 76 thus prevents the drive arc 24 from being released from engagement with the drive device 38 in the radial direction. The guide element 76 is mounted on a spacer or bearing element 78. The bearing element 78 is arranged on a screw that extends between the fastening elements 34 and 36. The drive arc 24 runs between the two fastening elements 34 and 36. The fastening elements 34 and 36 are connected to each other via screws. In order to establish and maintain a predetermined distance between the two fastening elements 34 and 36, the spacers 78 are provided, through which the screws extend.

Figure 10:
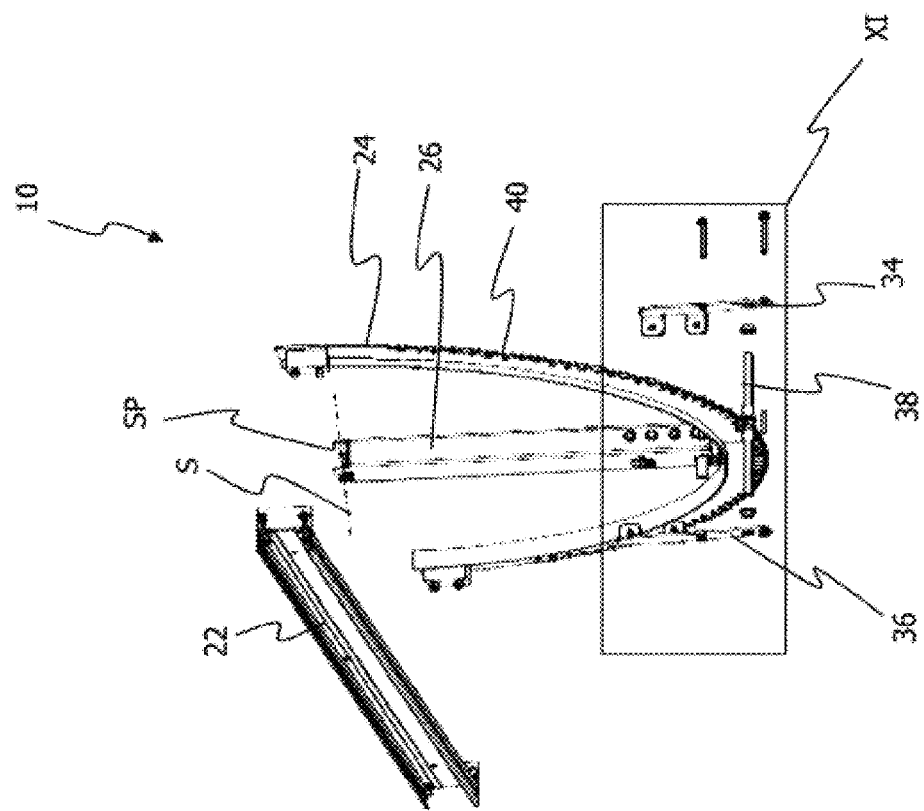
FIG. 10 shows a further exploded view of the pivot unit shown in FIGS. 3 to 9.

FIG. 10 shows an exploded perspective view of the pivot unit 10. FIG. 10 shows the cross member 22, the drive arc 24, the support element 26, the drive device 38 and the two fastening elements 34 and 36.

Figure 11:
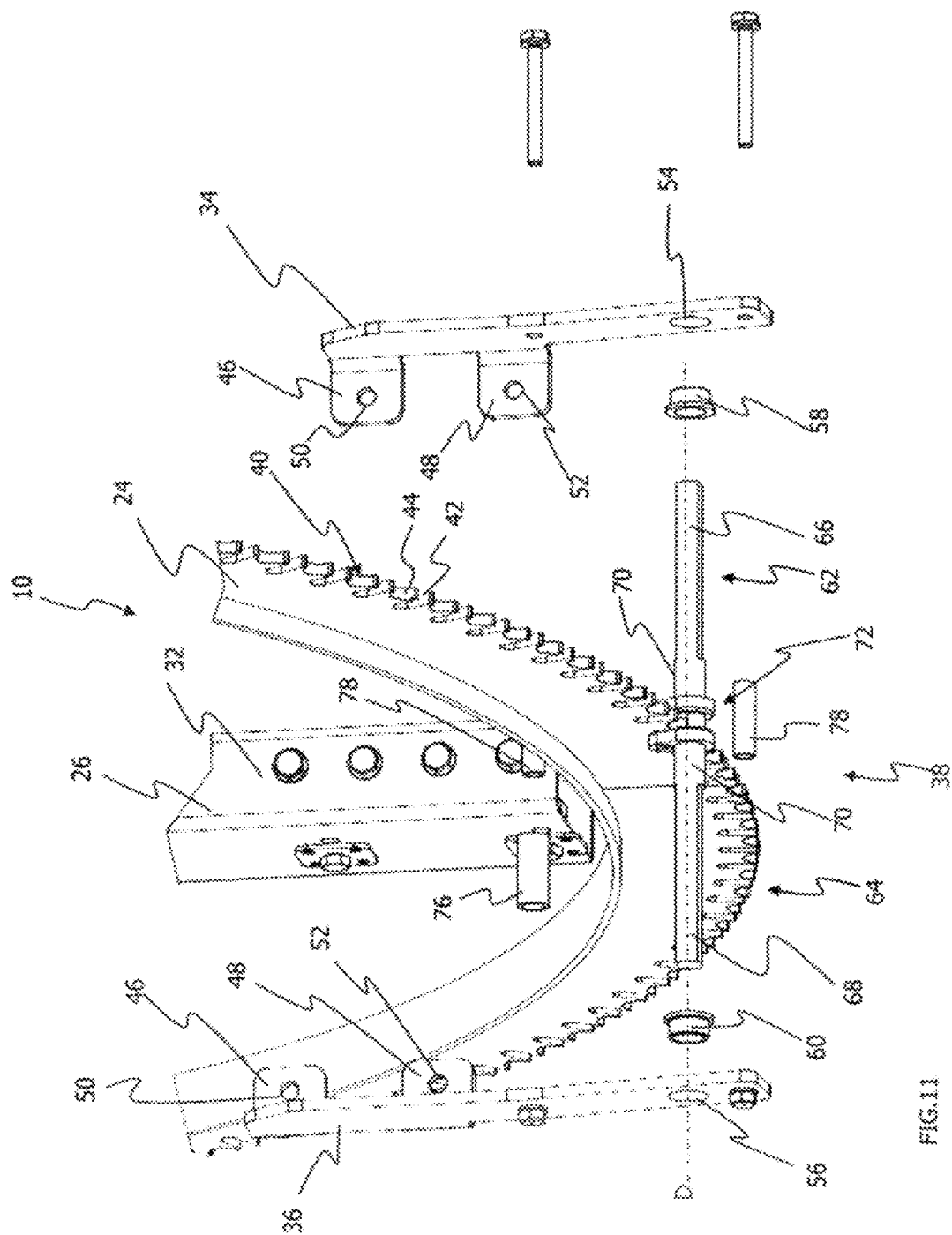
FIG. 11 shows an enlarged view of the section marked XI in FIG. 10.

FIG. 11 shows an enlarged view of the detail marked XI in FIG. 10. FIG. 11 shows the drive device 38, which is in engagement with the drive contour 40 of the drive arc 24, the fastening elements 34 and 36 and the end 32 of the support element 26.

The drive device 38 has two coupling elements 62 and 64 that extend from the drive portion 72 in the opposite direction. The bearing portions 70 of the coupling elements 62 and 64 adjoin the drive portion 72 in the direction of the rotation axis D. The coupling portions 66 and 68, with their cross section designed for coupling to a drive shaft 14, follow the bearing portions 70 in the direction of rotation axis D. In the assembled state of the pivot unit 10, the coupling elements 62 and 64 extend through the openings 54 and 56 and through the bearing bushings 58 and 60 arranged in the openings 54 and 56.

Figure 12:
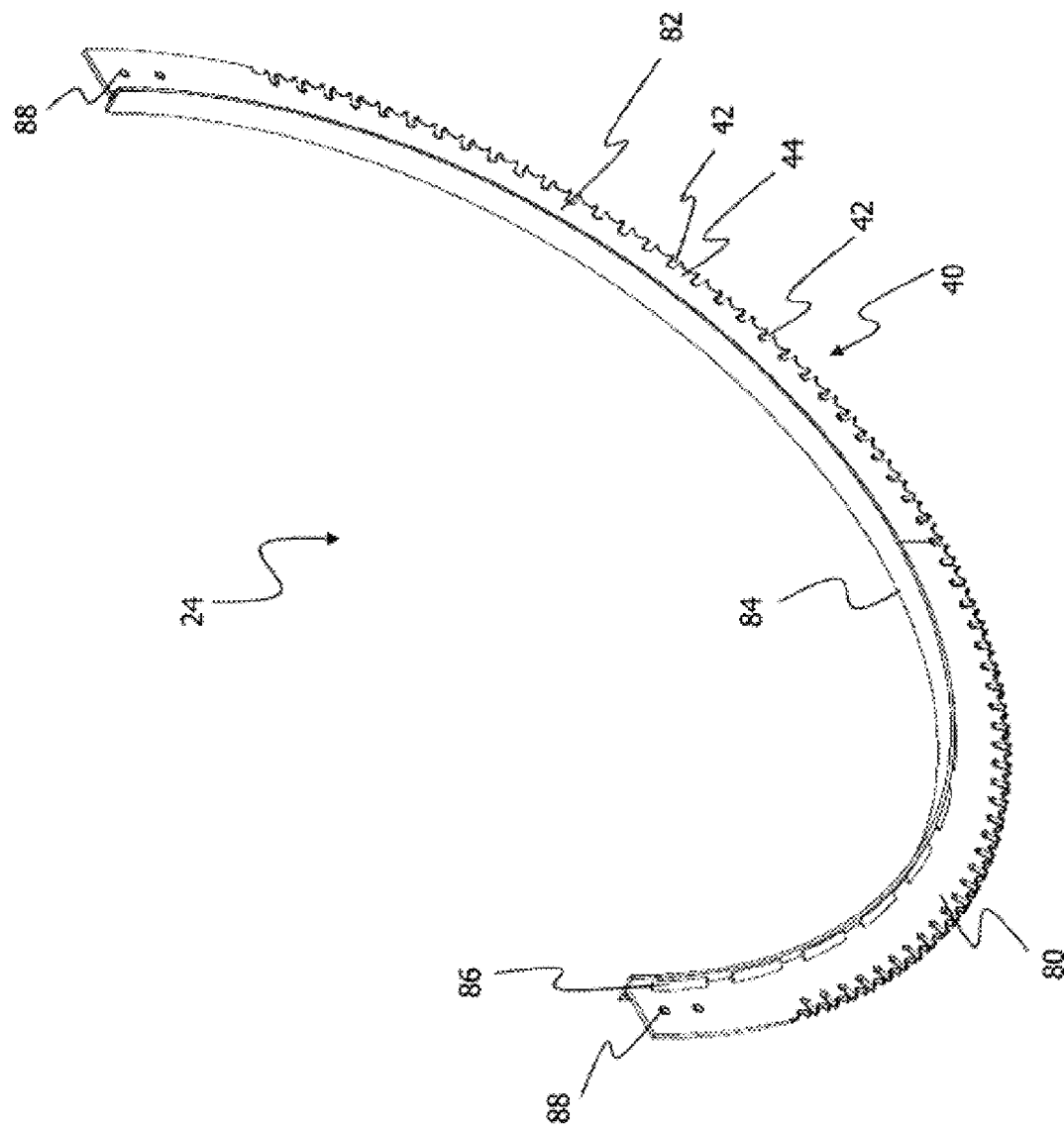
FIGS. 12 to 14 show different views of a drive arc of the pivot unit shown in FIGS. 3 to 11.
Figure 13:
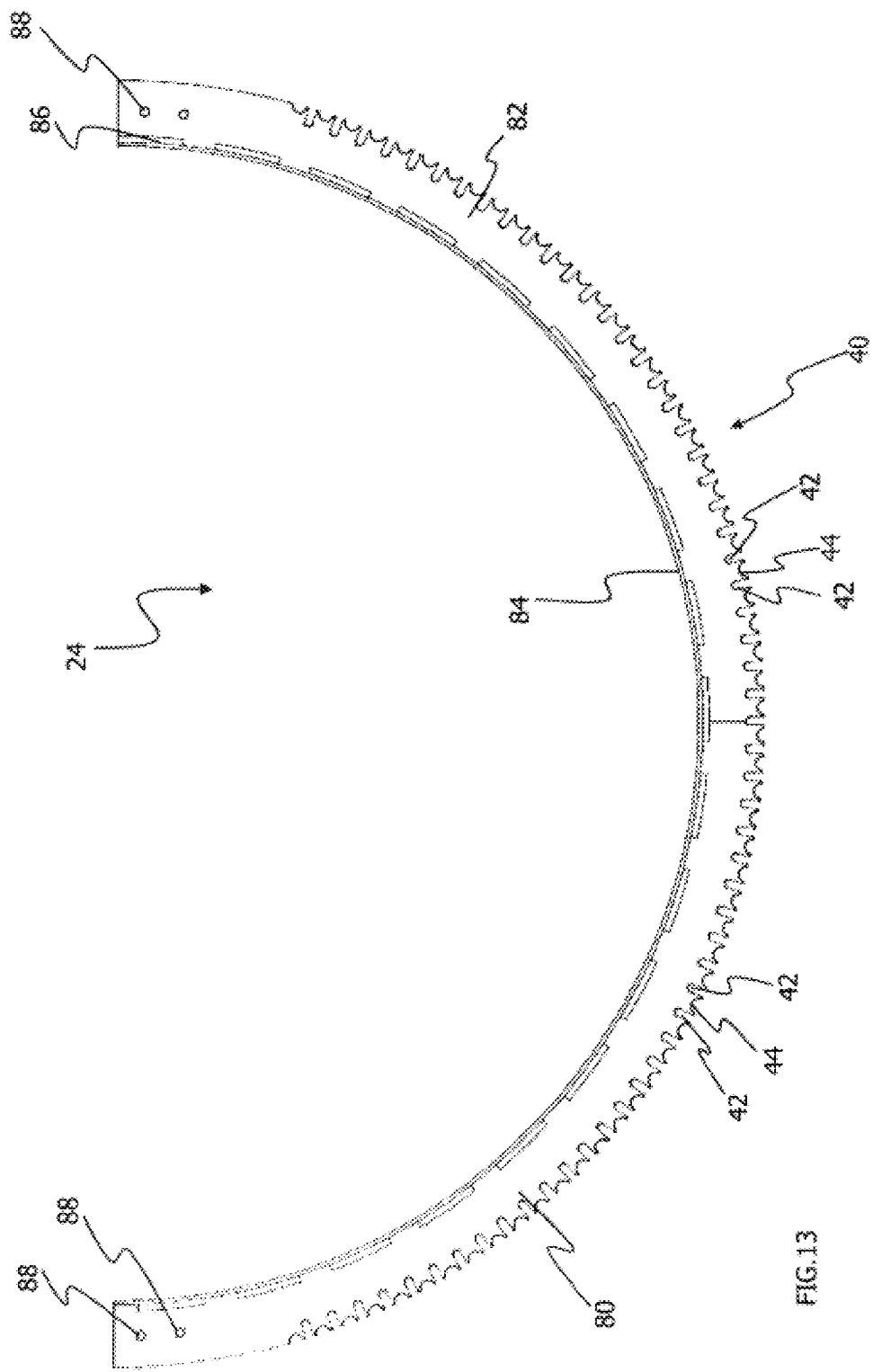
Figure 14:
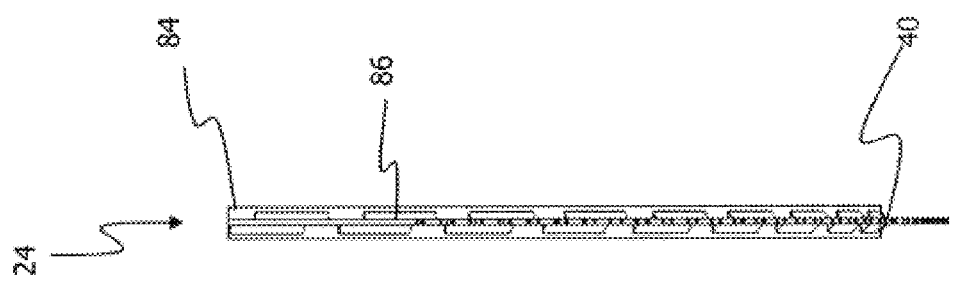

FIGS. 12 to 14 show different views of the drive arc 24. The drive arc 24 is composed of two partial arcs 80 and 82, which are connected to an arcuate base element 84. The partial arcs 80 and 82 may be welded to the base element 84, as can be seen from the welded seams 86 shown. Viewed in cross section, the drive arc 24 has a substantially T-shaped cross section through the base element 84. Starting from this base element 84, the partial arcs 80, 82 extend in the radial direction. The partial arcs 80, 82 each have two openings 88 via which the drive arc 24 may be connected to the cross member 22.

The drive contour 40 has drive recesses 42 and retaining recesses 44. The drive recesses 42 and the retaining recesses 44 are arranged alternately in the circumferential direction of the is drive arc 24. The drive recesses 42 are radial incisions in the drive arc 24. The drive recesses 42 may also be referred to as slot-shaped. The portions of the drive arc 24 formed between the drive recesses 42 or the incisions are provided with retaining recesses 44. The retaining recesses 44 are arched or curved. The retaining recesses 44 are substantially semicircular. The drive recesses 42 extend further into the drive arc 24 in the radial direction than the retaining recesses 44.

Figure 15:
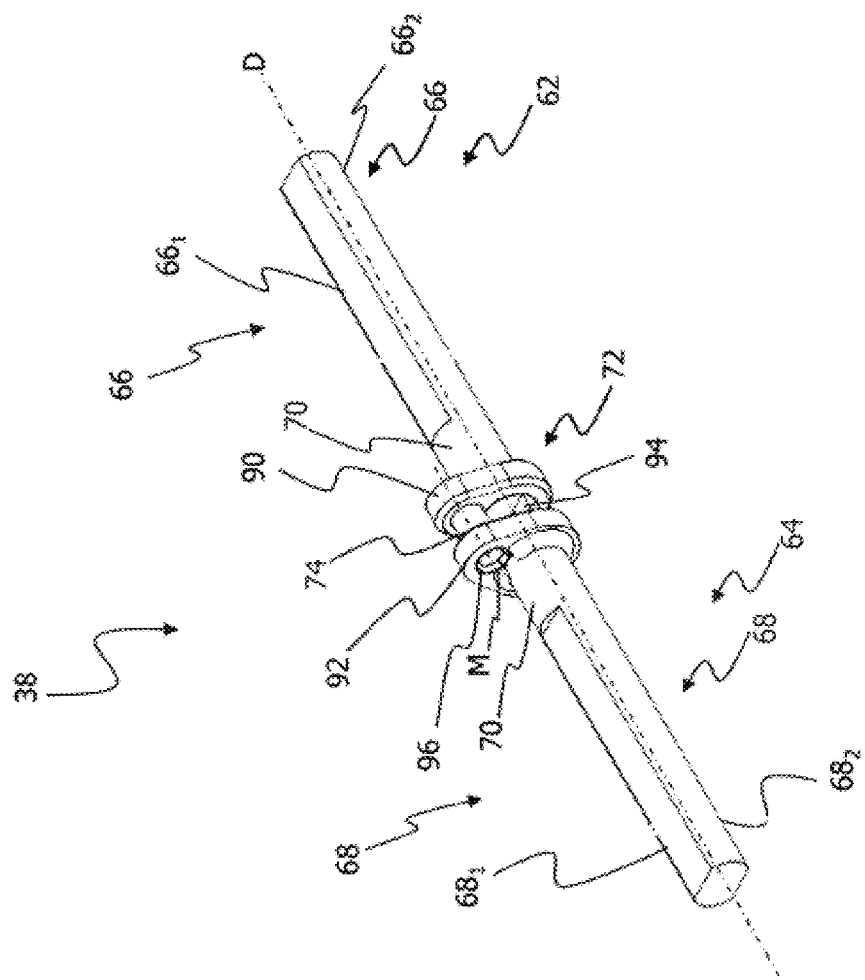

FIG. 15 shows a perspective view of the drive device 38. The drive device 38 is rotatable about the rotation axis D, which corresponds to the longitudinal axis of the drive device 38. The drive device 38 has a drive portion 72 and two coupling elements 62 and 64. The coupling elements 62 and 64 each have a bearing portion 70 and a coupling portion 66 and 68. The coupling portions 66 and 68 have a cross section that is suitable for coupling to a drive shaft 14 (see FIG. 1). This cross section is formed by flat portions $66_1$, $66_2$ and $68_1$, $68_2$ in the region of the coupling portions 66 and 68. The coupling portions 66 and 68 may be accommodated, for example, in a drive shaft 14 having a recess that is complementary to the cross section of the coupling portions 66 and 68. The coupling elements 62 and 64 extend in the opposite direction from the drive portion 72.

In addition to the drive element 74, the drive portion 72 comprises two connecting elements 90 and 92 that connect the coupling elements 62 and 64 to the drive element 74. The connecting elements 90 and 92 may be formed in one piece with the coupling elements 62 and 64. The connecting elements 90 and 92 are cam-shaped. The drive portion 72 also comprises a retaining element 94. The drive element 74 and the retaining element 94 extend between the two connecting elements 90 and 92. The retaining element 94 is formed in the shape of a semi-circle and arranged coaxially with the coupling elements 62 and 64. The drive element 74 is arranged eccentrically. The longitudinal axis M of the drive element 74 extends parallel but offset in the radial direction in relation to the rotation axis D of the drive device 38. The drive element 74 may be rod-shaped. The drive element 74 is accommodated in openings 96 in the connecting elements 90 and 92.

FIG. 16 shows a front view of the drive device 38. The bearing portions 70 of the coupling elements 62 and 64 have a circular cross section. A step can be seen at the transition between the bearing portions 70 and the coupling portions 66 and 68 with their flat portions $66_1$, $66_2$ and $68_1$, $68_2$. The drive element 74 and the retaining element 94 extend between the two connecting elements 90 and 92. The drive element 74 is arranged eccentrically. The drive element 74 extends offset in the radial direction parallel to the rotation axis D. A clearance 98 can be seen between the drive element 74 and the retaining element 94. The retaining element 94 has a semicircular outer contour, the outer surface of which in this embodiment extends on the same radius as the outer circumferential surfaces of the bearing portions 70 of the coupling elements 62 and 64 about the rotation axis D of the drive device 38.

FIG. 17 shows a side view of the drive device 38, in which the coupling element 64, the connecting element 92 and the drive element 74 are shown. The connecting element 92 is cam-shaped. An opening 96 is formed in the connecting element 92, in which opening the drive element 74 is accommodated.

FIGS. 18 to 33 described below show a pivot unit 10 according to a second embodiment. The same reference numerals as in the first embodiment are used for features or components having the same or an equivalent effect. To avoid repetitions, the differences between the two embodiments are described in detail below. Components and features that have already been described in detail with regard to the first embodiment are not described again in detail. The description of these components and features also applies analogously to the second embodiment.

FIGS. 18 to 22 show different views of a pivot unit 10 according to the second embodiment. The pivot unit 10 comprises a cross member 22, a drive arc 24 attached to the cross member 22 and a support element 26. The drive arc 24 is connected to the cross member 22 via fastening means 28. Connecting elements 30 are attached at the ends of the cross member 22, via which connecting elements the cross member 22 may be connected to the mounting rails 16 and 18 (FIG. 1).

In contrast to the first embodiment, the support element 26 according to the second embodiment does not comprise a C-shaped cross section, but is rectangular in cross section. A pivot axis S extends through the pivot point SP formed at the connection point between the cross member 22 and the support element 26.

Furthermore, it can already be seen in FIGS. 18 to 22 that the drive device 38 according to the second embodiment differs from the drive device of the first embodiment. The drive device 38 and in particular the differences from the drive device according to the first embodiment will be discussed in detail in the further course of the description.

FIG. 23 shows an exploded perspective view of the pivot unit 10. FIG. 23 shows the cross member 22, the drive arc 24, the support element 26, the drive device 38 and the two fastening elements 34 and 36.

Figure 24:
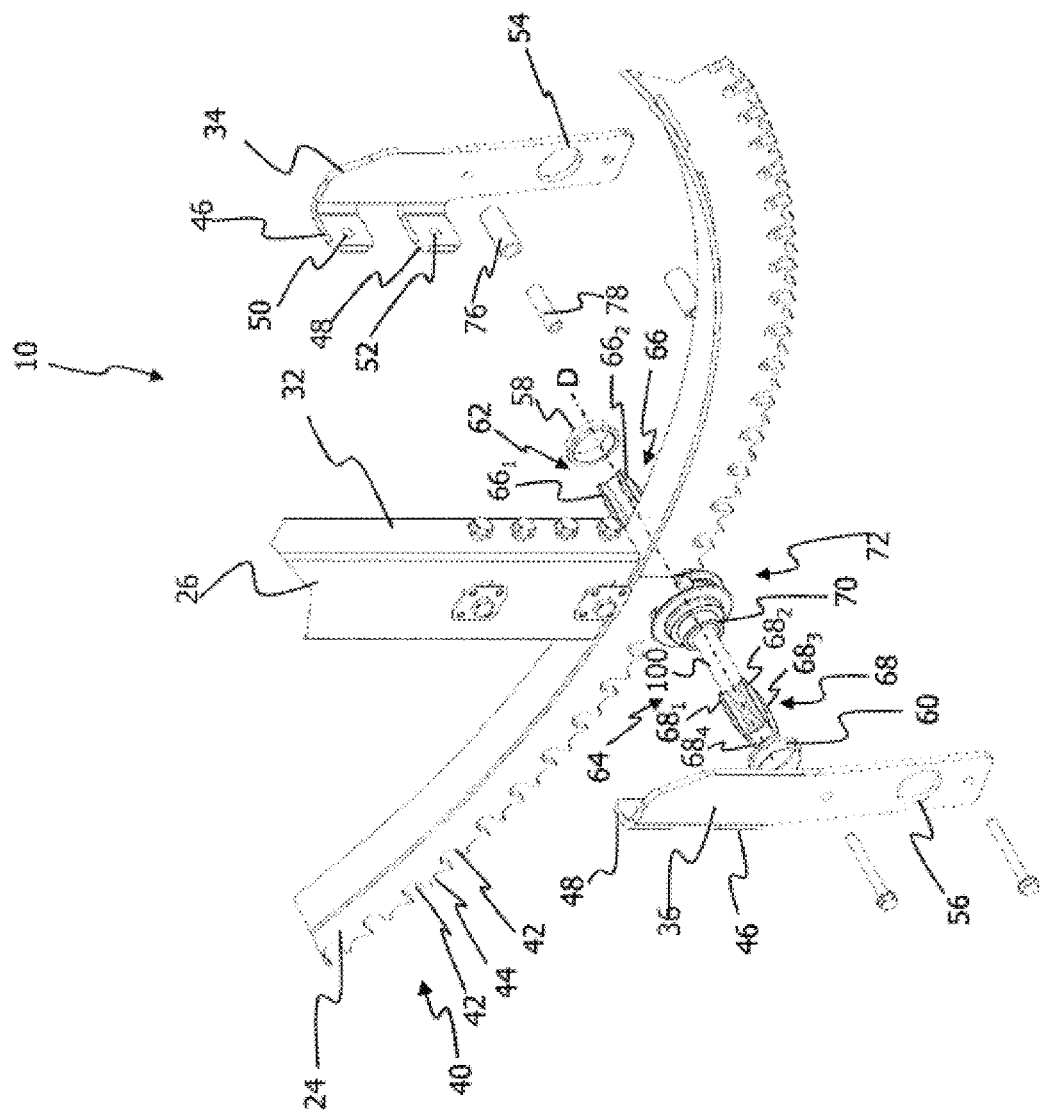
FIG. 24 shows an enlarged view of the section marked XXIV in FIG. 23.

FIG. 24 shows an enlarged view of the detail marked XXIV in FIG. 23. FIG. 24 shows the end 32 of the support element 26, the two fastening elements 34 and 36 and a portion of the drive arc 24.

The drive device 38 comprises two coupling elements 62 and 64. The coupling elements 62 and 64 each have a coupling portion 66, 68 and a bearing portion 70, only the bearing portion 70 being visible on the coupling element 64 in FIG. 24. The coupling portions 66 and 68 have projections $66_1$, $66_2$, $66_3$, $66_4$ and $68_1$, $68_2$, $68_3$, $68_4$ extending in the radial direction, via which the drive device 38 may be coupled to a correspondingly designed drive shaft 14 (see FIG. 1), $66_3$ and $66_4$ not being visible in FIG. 24. The coupling portions 66 and 68 are each connected to the bearing portions 70 via a rod-shaped portion 100. The drive portion 72 of the drive device 38 is provided between the coupling elements 62 and 64, in which drive portion the drive element 74 and the retaining element 94 are formed. The drive element 74 and the retaining element 94 alternately engage in the drive contour 40 of the drive arc 24.

Figure 25:
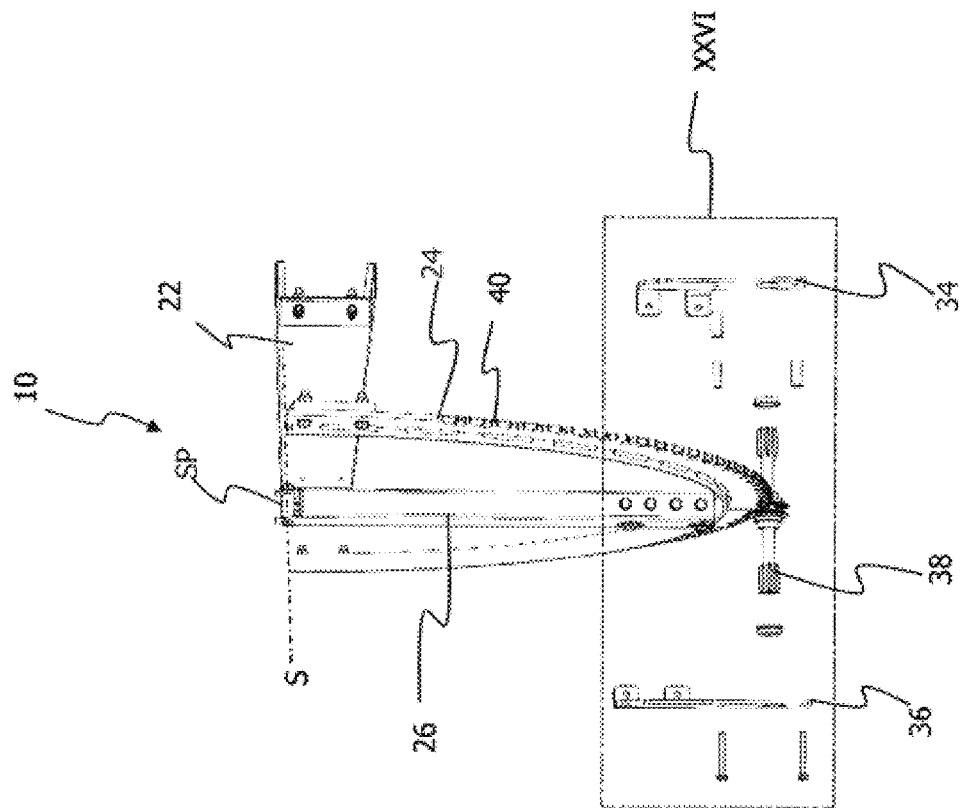
FIG. 25 shows a further exploded view of the pivot unit shown in FIGS. 18 to 23.

FIG. 25 shows a further exploded perspective view of the pivot unit 10. FIG. 25 shows the cross member 22, the drive arc 24, the support element 26, the drive device 38 and the two fastening elements 34 and 36.

Figure 26:
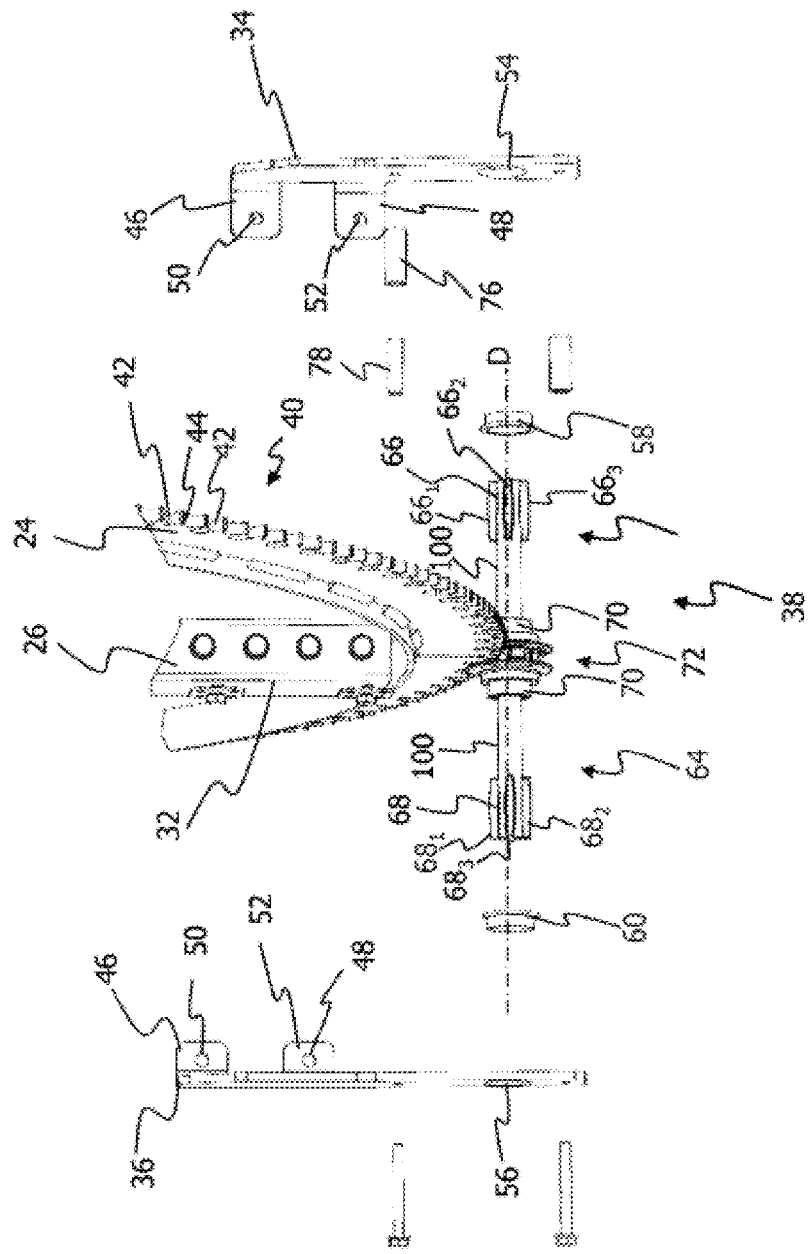
FIG. 26 shows an enlarged view of the section marked XXVI in FIG. 25.

FIG. 26 shows an enlarged view of the section marked XXVI in FIG. 25. FIG. 26 shows the drive device 38, which is in engagement with the drive contour 40 of the drive arc 24, the fastening elements 34 and 36 and the end 32 of the support element 26.

The drive device 38 has two coupling elements 62 and 64 that extend from the drive portion 72 in the opposite direction. The bearing portions 70 of the coupling elements 62 and 64 adjoin the drive portion 72 in the direction of the rotation axis D. The connecting portions 100, which connect the bearing portions 70 to the coupling portions 66 and 68, follow the bearing portions 70 in the direction of the rotation axis D. The coupling portions 66 and 68 form the termination of the drive device 38 in the axial direction. In the assembled state of the pivot unit 10, the coupling elements 62 and 64 extend through the openings 54 and 56 and through the bearing bushings 58 and 60 arranged in the openings 54 and 56.

Figure 27:
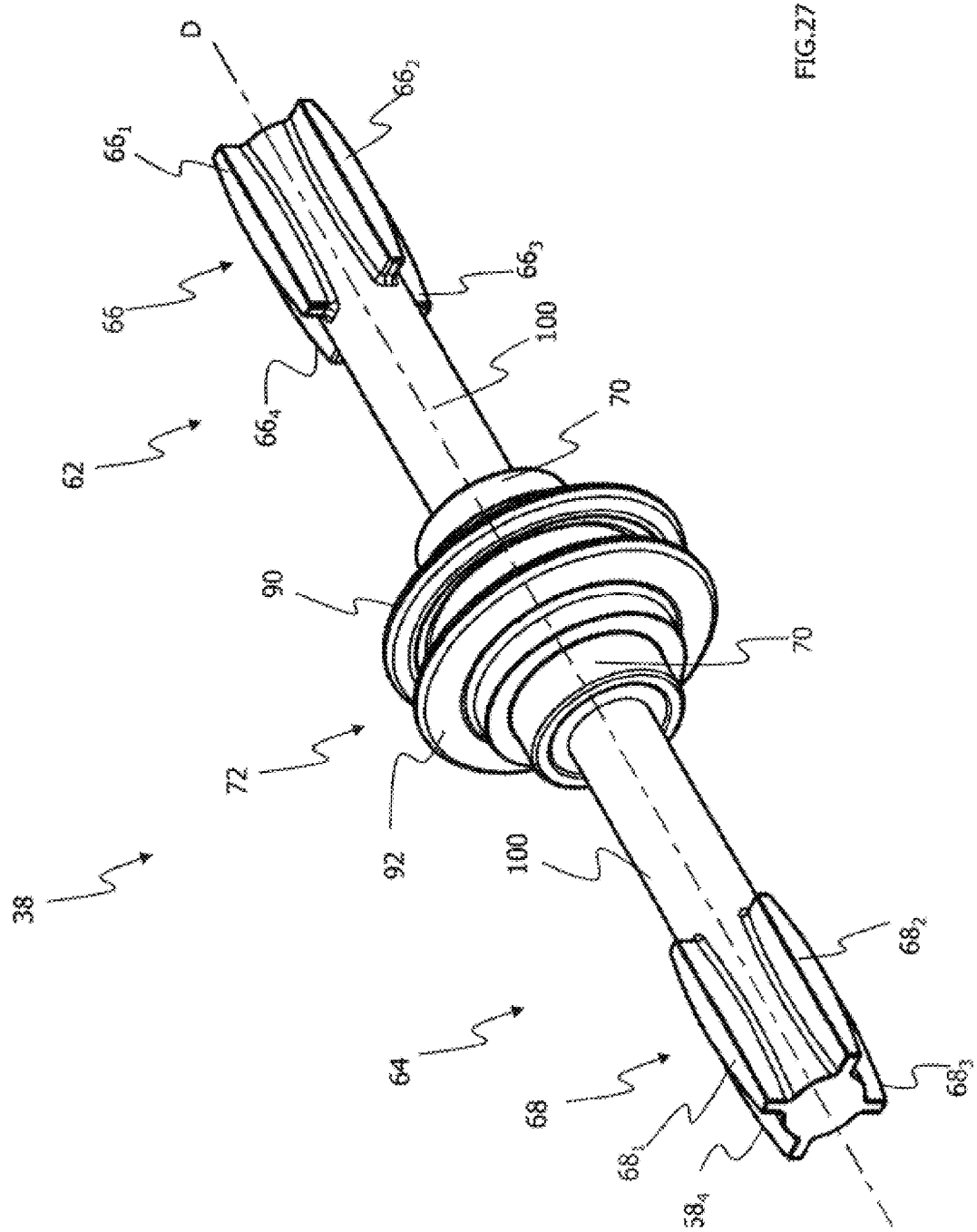
FIGS. 27 to 33 show different views of a drive device of the pivot unit shown in FIGS. 18 to 26.

FIG. 27 shows a perspective view of the drive device 38. The drive device 38 is rotatable about the rotation axis D, which corresponds to the longitudinal axis of the drive device 38. The drive device 38 has a drive portion 72 and two coupling elements 62 and 64. The coupling elements 62 and 64 each have a bearing portion 70 and a coupling portion 66 and 68. The coupling portions 66 and 68 are connected to the bearing portions 70 via the connecting portions 100. The coupling portions 66 and 68 comprise the projections $66_1$, $66_2$, $66_3$, $66_4$ and $68_1$, $68_2$, $68_3$, $68_4$ projecting in the radial direction. The coupling portions 66 and 68 may, with their projections $66_1$, $66_2$, $66_3$, $66_4$ and $68_1$, $68_2$, $68_3$, $68_4$, be coupled to a drive shaft 14 (see FIG. 1) to transmit torque. The coupling portions 66 and 68 and a portion of the drive shaft 14 (see FIG. 1) may be designed to be complementary. The coupling portions 66 and 68 and the corresponding portion of a drive shaft 14 may be complementary such that they may be brought into engagement with one another. The coupling portions 66 and 68 and/or the portion of the drive shaft 14 may be designed in such a way that assembly-related distance tolerances between adjacent pivot units 10 or posts 12 arranged next to one another are compensated to a limited extent. For example, the coupling elements 66 and 68 and the drive shaft may be designed in such a way that they are in engagement with one another in the direction of the pivot axis to allow a displacement relative to one another in order to be able to compensate for the tolerances mentioned.

The drive portion 72 has two connecting elements 90 and 92. The connecting elements 90 and 92 may be formed in one piece with the coupling elements 62 and 64 and/or the drive element 74 and/or the retaining element 94. The connecting elements 90 and 92 are disk-shaped.

Figure 28:
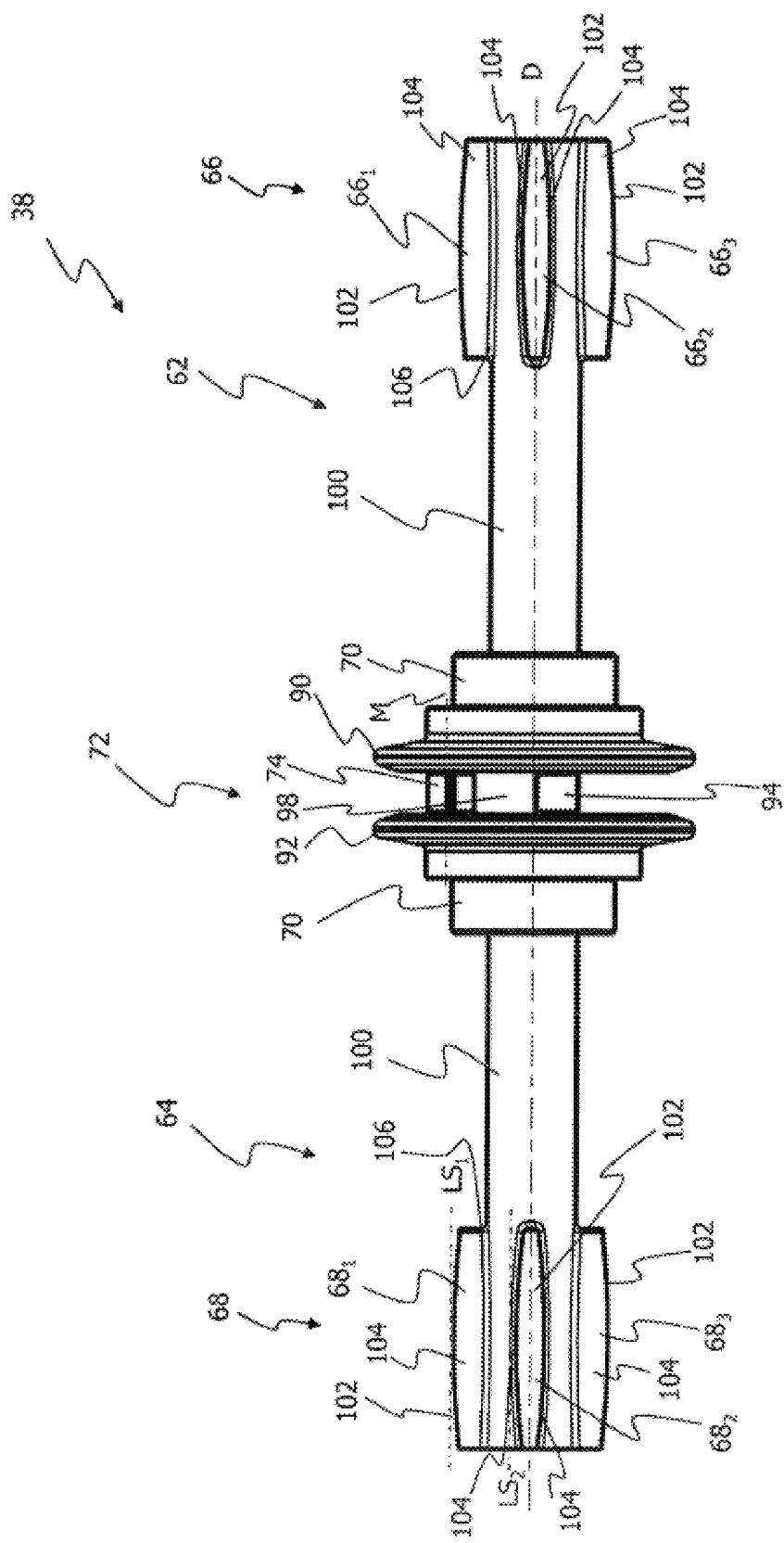

FIG. 28 shows a front view of the drive device 38. The drive element 74 and the retaining element 94 extend between the disk-shaped connecting elements 90 and 92. The connecting element 74 is arranged eccentrically. The retaining element 94 has a semicircular outer contour. The drive device 38 is rotatable about the rotation axis D. The rotation axis D extends through the center point of the semicircular outer contour of the retaining element 94. A clearance 98 can be seen between the drive element 74 and the retaining element 94. The retaining element 94 is designed in cross section in the form of a circle sector having a semicircular outer contour (hereinafter referred to as "semicircular sector shape") and is arranged coaxially with the coupling elements 62 and 64. The drive element 74 is arranged eccentrically. The longitudinal axis M of the drive element 74 extends parallel but offset in the radial direction in relation to the rotation axis D of the drive device 38.

The coupling portions 66 and 68 comprise the projections 66$_1$, 66$_2$, 66$_3$, 66$_4$ and 68$_1$, 68$_2$, 68$_3$, 68$_4$ projecting in the radial direction, which projections may couple the drive device 38 to a drive shaft 14 (see FIG. 1) to transfer torque. The projections 66$_4$ and 68$_4$ are not shown in FIG. 28 (see FIG. 27). The explanations below also apply analogously to the projections 66$_4$ and 68$_4$, which are not shown in FIG. 28. The projections 66$_1$, 66$_2$, 66$_3$ and 68$_1$, 68$_2$, 68$_3$ are spherical to compensate for angular misalignments between the drive device 38 and the drive shaft 14. For this purpose, the projections 66$_1$, 66$_2$, 66$_3$ and 68$_1$, 68$_2$, 68$_3$ have a curved radial outer surface 102. The outer surface 102 is curved in the direction of the rotation axis D. The curvature is illustrated by the line LS$_1$ depicted in FIG. 28, which extends parallel to the rotation axis D. Furthermore, the projections 66$_1$, 66$_2$, 66$_3$ and 68$_1$, 68$_2$, 68$_3$ comprise side surfaces 104 that are curved and extend in the radial direction. The side surfaces 104 extend in the radial direction between the outer surface 102 and the foot 106 of the respective projection 66$_1$, 66$_2$, 66$_3$ and 68$_1$, 68$_2$, 68$_3$. For reasons of clarity, the foot 106 of the projections 66$_1$, 66$_2$, 66$_3$ and 68$_1$, 68$_2$, 68$_3$ is provided with a reference sign in FIG. 28 only for the projections 66$_1$ and 68$_1$. The side surface 104 is curved in the direction of the rotation axis D, as indicated by the line LS$_2$ depicted on one of the side surfaces 104 in FIG. 28. The line LS$_2$ extends parallel to the rotation axis D. Due to the curvature of the radial outer surfaces 102 and the curved side surfaces 104 of the projections 66$_1$, 66$_2$, 66$_3$, 66$_4$ and 68$_1$, 68$_2$, 68$_3$, 68$_4$, angular offsets may be compensated for between the drive device 38 and the drive shaft 14.

Figure 29:
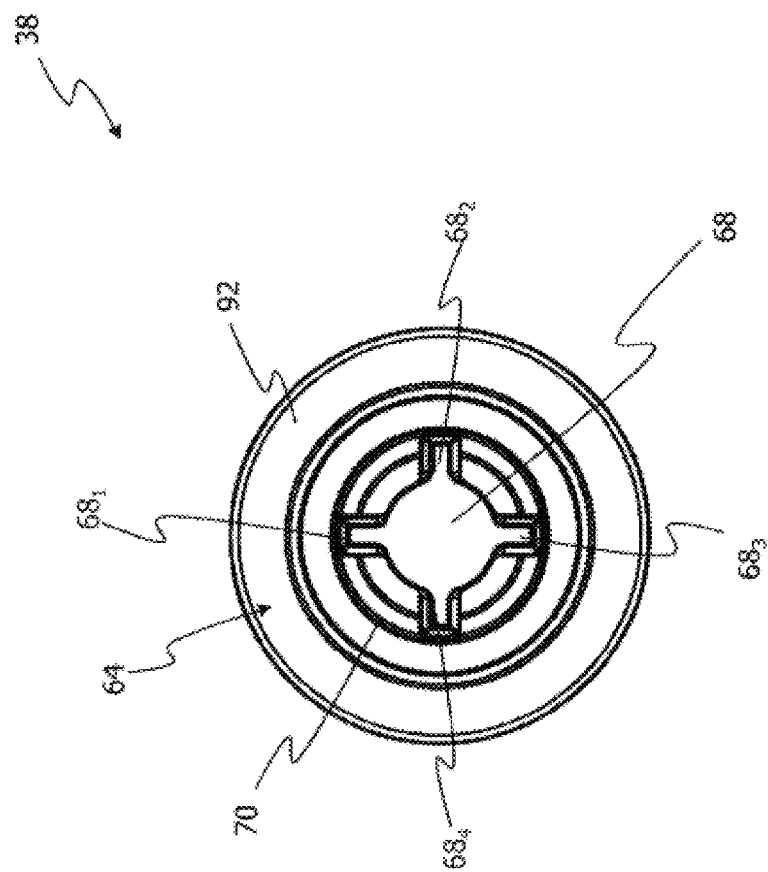

FIG. 29 shows a side view of the drive device 38, in which the coupling element 64, the coupling portion 68 thereof and the connecting element 92 are shown. The connecting element 92 is disk-shaped. The coupling portion 68 comprises the projections 68$_1$, 68$_2$, 68$_3$, 68$_4$ projecting in the radial direction. The projections 68$_1$, 68$_2$, 68$_3$, 68$_4$ are offset by 90° to each other.

Figure 30:
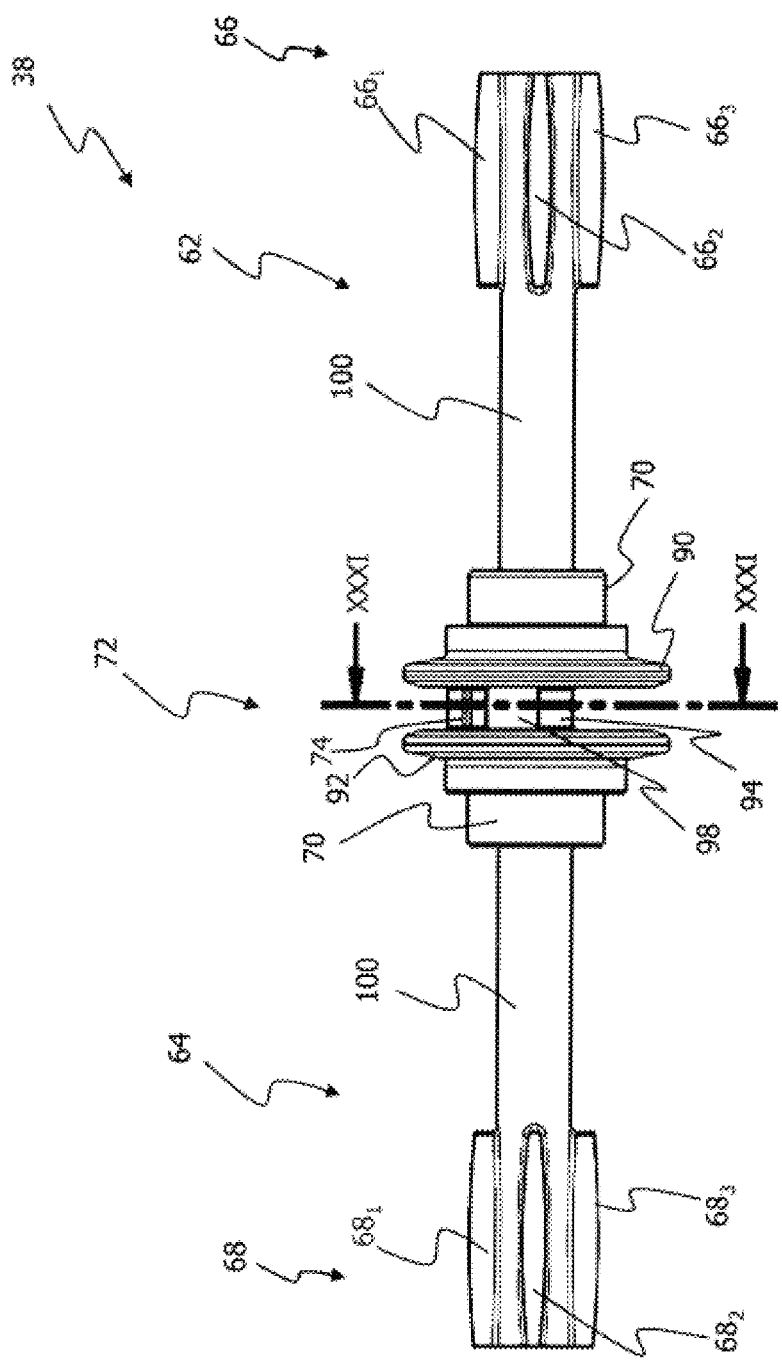
Figure 31:
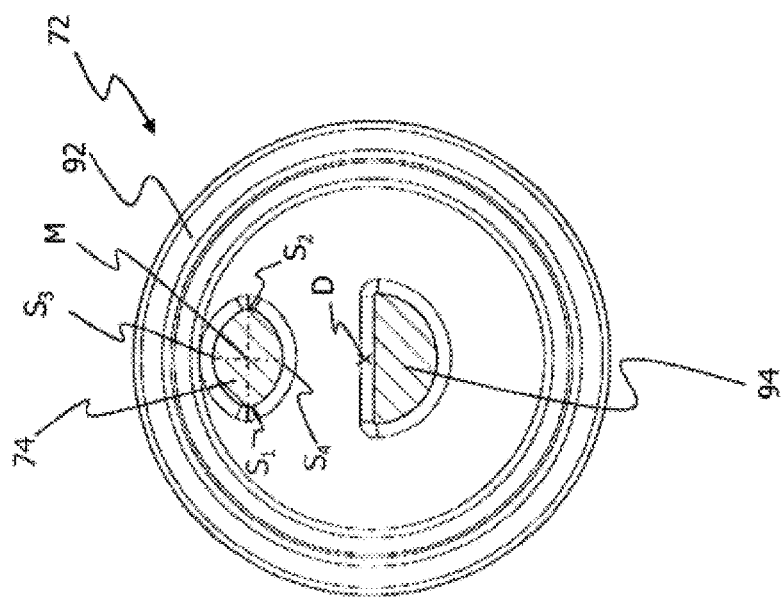

FIG. 30 corresponds to the front view of the drive device 38 according to FIG. 28, the difference being that the section line XXXI-XXXI has been depicted. FIG. 31 shows a sectional view along the section line XXXI-XXXI in FIG. 30. FIG. 31 shows the disk-shaped connecting element 92, the drive element 74 and the retaining element 94. The retaining element 94 is semicircular in cross section.

Figure 32:
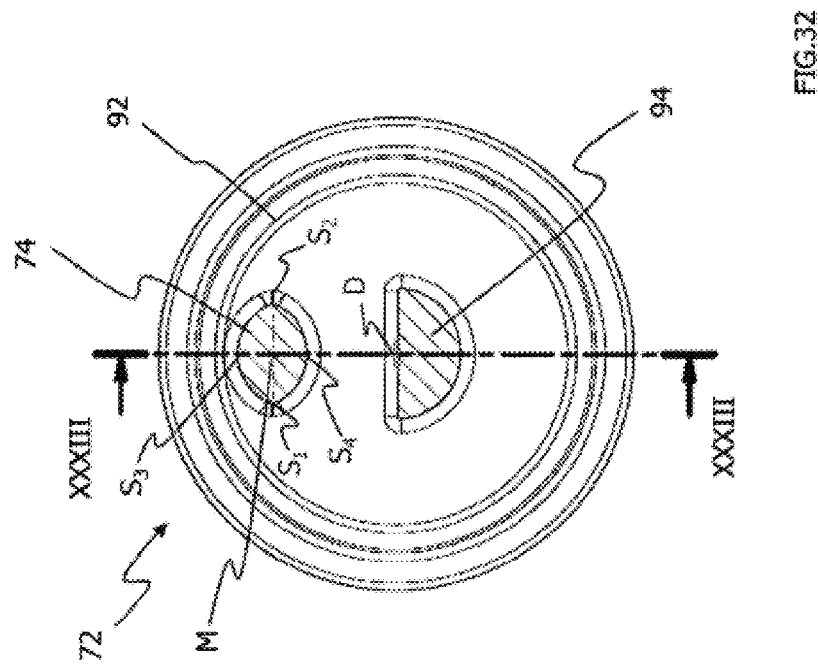

The drive element 74 has a cross section that is different from a circular cross section and that is curved at least in some sections. The cross section of the drive element 74 is reduced in the radial direction with respect to the rotation axis D compared to a circular cross section. The cross section of the drive element 74 may be described as oval or elliptical. As indicated in FIGS. 31 and 32, the cross section of the drive element 74 has four apexes S$_1$, S$_2$, S$_3$ and S$_4$. Between the apexes S$_1$ and S$_2$, the drive element 74 has its greatest extent in a direction transverse to the radial direction. In other words, the distance between the apexes S$_1$ and S$_2$ defines the greatest extent of the drive element 74. The apexes S$_3$ and S$_4$ are aligned in the radial direction. The distance between the apexes S$_3$ and S$_4$ is smaller than the distance between the apexes S$_1$ and S$_2$. The smaller distance between the apexes S$_3$ and S$_4$ aligned in the radial direction makes it clear that the cross section of the drive element 74 is reduced in the radial direction.

The reduced cross section of the drive element 74 in the radial direction may ensure the engagement of the drive element 74 in one of the drive recesses 42 such that the function of the pivot unit 10 may be ensured permanently. With the cross section of the drive element 74 being reduced in the radial direction, the drive element 74 may securely engage in the corresponding drive recess 42, even if the radial distance between the drive device 38 and the drive arc has increased. In particular, tolerance fluctuations within the pivot unit 10 may be compensated for. Should the radial distance between the drive device 38 and the drive arc 24 increase due to tolerance fluctuations and/or elastic deformation, the oval cross section of the drive element 74 will enable the drive element 74 to engage securely in the drive contour 40 of the drive arc 24 even in this case.

Furthermore, the distance between the opposite flanks of the drive recesses 42 (see for example FIGS. 24 and 26) may increase in the radial direction. The drive recesses 42 widen in the radial direction. This also ensures the safe "threading" or the secure engagement of the drive element 74 in one of the drive recesses 42 even with an increased radial distance between the drive device 38 and that of the drive arc 24.

Figure 33:
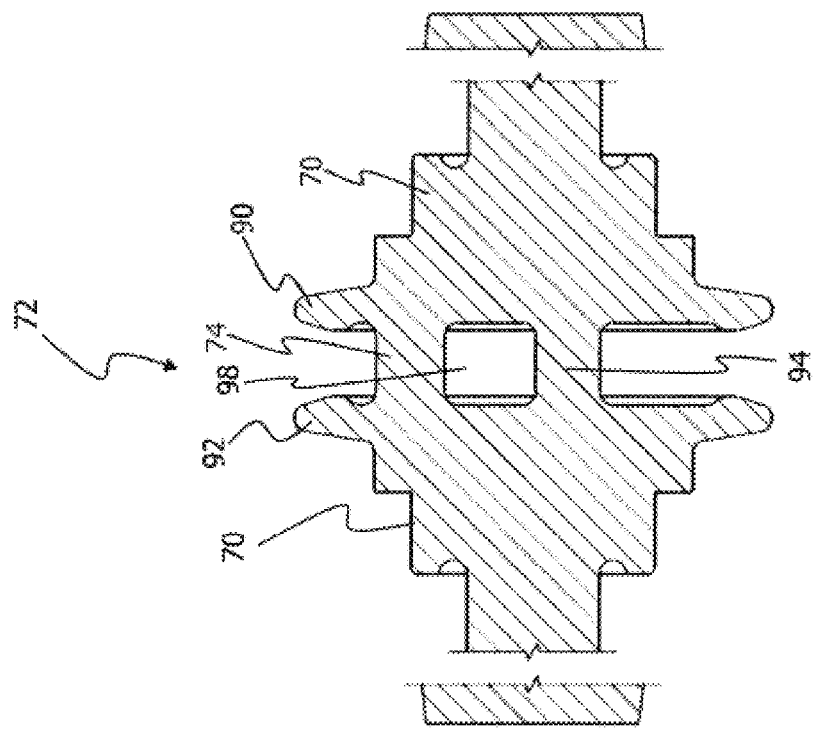

FIG. 32 corresponds to FIG. 31, the section line XXXIII-XXXIII having been depicted in FIG. 32. FIG. 33 shows a sectional view along the section line XXXIII-XXXIII in FIG. 32. The drive portion 72 has two connecting elements 90 and 92. The connecting elements 90 and 92, the drive element 74 and the retaining element 94 may be formed in one piece. The drive element 74 and the retaining element 94 extend between the disk-shaped connecting elements 90 and 92. The drive element 74 is arranged offset in the radial direction in relation to the retaining element 94 such that the clearance 98 is formed.

FIGS. 34 to 42 described below show a pivot unit 10 according to a third embodiment. The same reference numerals as in the first two embodiments are used for features or components having the same or an equivalent effect. To avoid repetitions, the differences between the third embodiment and the previous embodiments are described in detail below. Components and features that have already been described in detail with regard to the first and/or the second embodiment are not described again in detail. The description of these components and features also applies analogously to the third embodiment.

Figure 34:
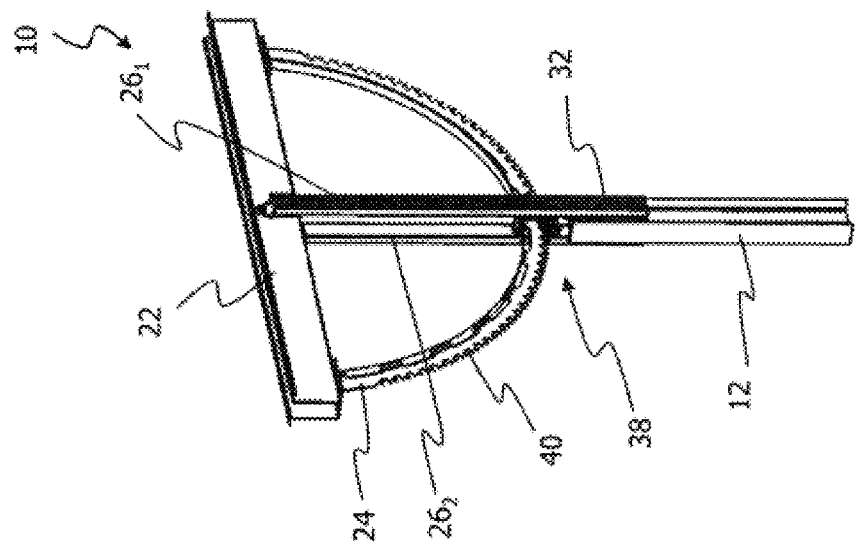
FIGS. 34 to 37 show perspective views of a pivot unit according to a third embodiment of the invention in a state attached to a post.

FIG. 34 shows a perspective view of a pivot unit 10 according to a third embodiment in a state attached to a post 12. The pivot unit 10 comprises a cross member 22, a drive arc 24 attached thereto and two support elements 26$_1$ and 26$_2$. The drive device 38 is only hinted at in FIG. 34. The pivot unit 10 is connected to the post 12 via the support elements 26$_1$ and 26$_2$. The ends 32 of the support elements 26$_1$ and 26$_2$ form a connecting portion via which the support elements 26$_1$ and 26$_2$ are connected to one another and to the post 12. The posts 12 according to this embodiment have an H-shaped cross section. The support elements 26$_1$ and 26$_2$ are supported on the post 12 by means of spacers that cannot be seen in FIG. 34.

Figure 35:
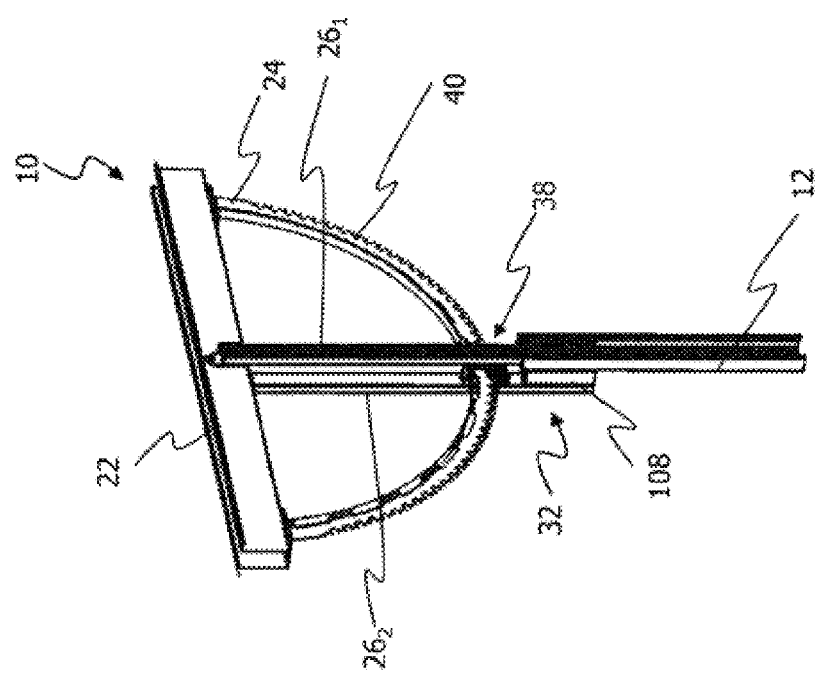

FIG. 35 shows a further perspective view of a pivot unit 10 according to a third embodiment in a state attached to a post 12. The substantial difference from the illustration according to FIG. 34 can be seen in the cross section of the post 12. According to FIG. 35, the post has a C-shaped cross section and has no H-shaped cross section like the post 12 according to FIG. 34. The support element 26$_2$ is supported on the post 12 via a spacer 108. The support element 26$_1$ lies against the post 12. As mentioned, spacers are also provided in FIG. 34, which are arranged on both sides of the post 12 and are of the same size. Said spacers are not shown in FIG. 34.

Figure 36:
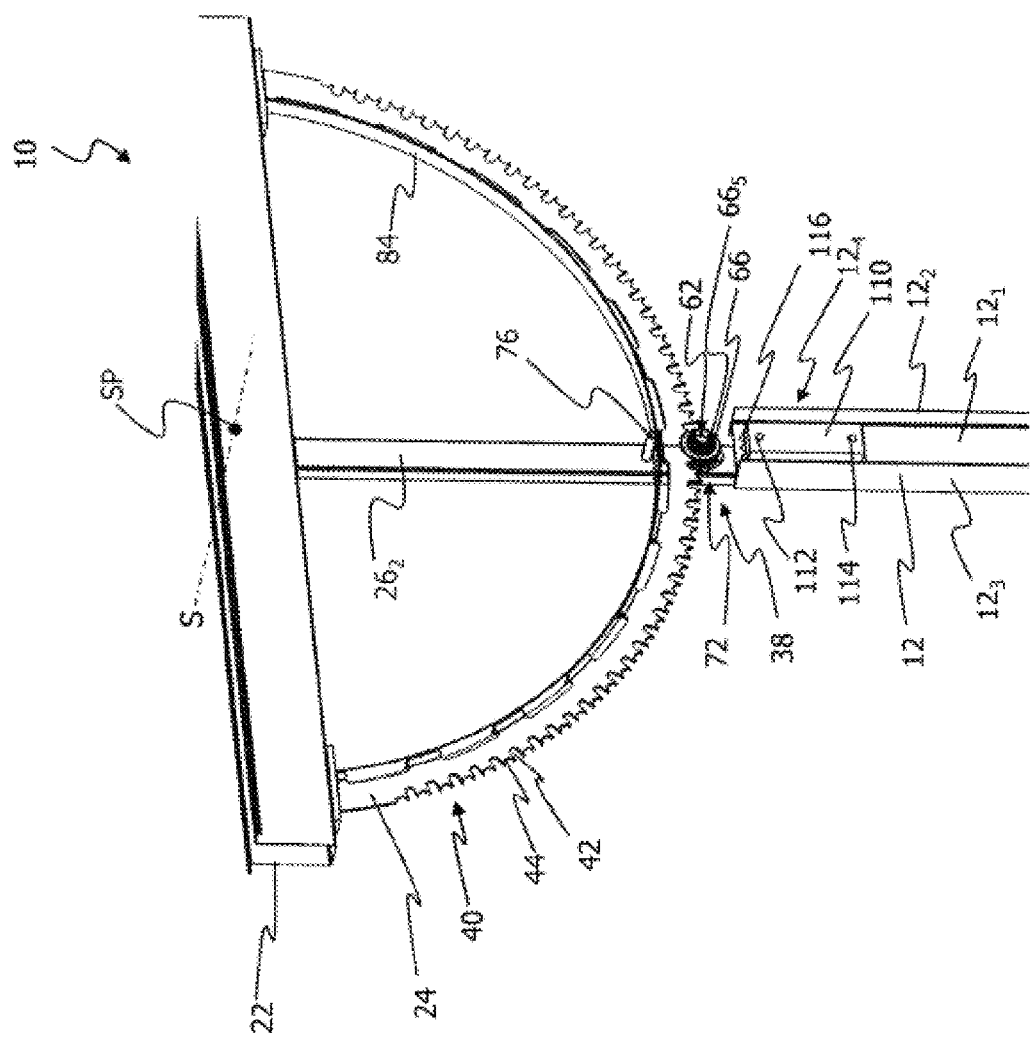

FIG. 36 shows an enlarged perspective view of the pivot unit 10, the support element 26$_1$ having been hidden. The H-shaped cross section of the post 12 can be clearly seen in FIG. 36. The H-shaped cross section of the post 12 is composed of a cross leg $12_1$ and two lateral legs $12_2$ and $12_3$ that are connected to one another via the cross leg $12_1$. A spacer 110 rests on the cross leg $12_1$ on both sides. The spacers 110, the support element $26_2$ and the support element $26_1$, not shown in FIG. 36, are connected to the post 12 via connecting elements 112 and 114. For this purpose, the cross leg $12_1$ of the post 12 has a plurality of openings 116, which are indicated in FIG. 36 above the spacer 110. The openings 116 are formed in an end portion $12_4$ of the post 12, which is used for connection to the pivot unit 10. The end portion $12_4$ forms a connecting portion for connecting the post 12 to the support elements $26_1$ and $26_2$.

The cross member 22 has a U-shaped or hat-shaped cross section. The drive arc 24 is fastened to the cross leg of the U-shape. The drive arc 24 has the drive contour 40. The drive contour 40 is composed of a plurality of drive recesses 42 and a plurality of retaining recesses 44 that are arranged alternately in the circumferential direction of the drive arc 24. The drive device 38 engages with the drive contour 40 of the drive arc 24 via its drive portion 72.

The coupling portion 66 of the coupling element 62 can be seen in FIG. 36. The coupling portion 66 has a recess $66_5$ that has a hexagonal cross section. The same applies to the coupling portion 68 of the coupling element 64, which, however, is not shown in FIG. 36 (see FIG. 42). The drive arc 24 may be supported on the guide element 76 in the radial direction via its base element 84. The guide element 76 is designed in the form of a radial stop having a circular cross section.

Figure 37:
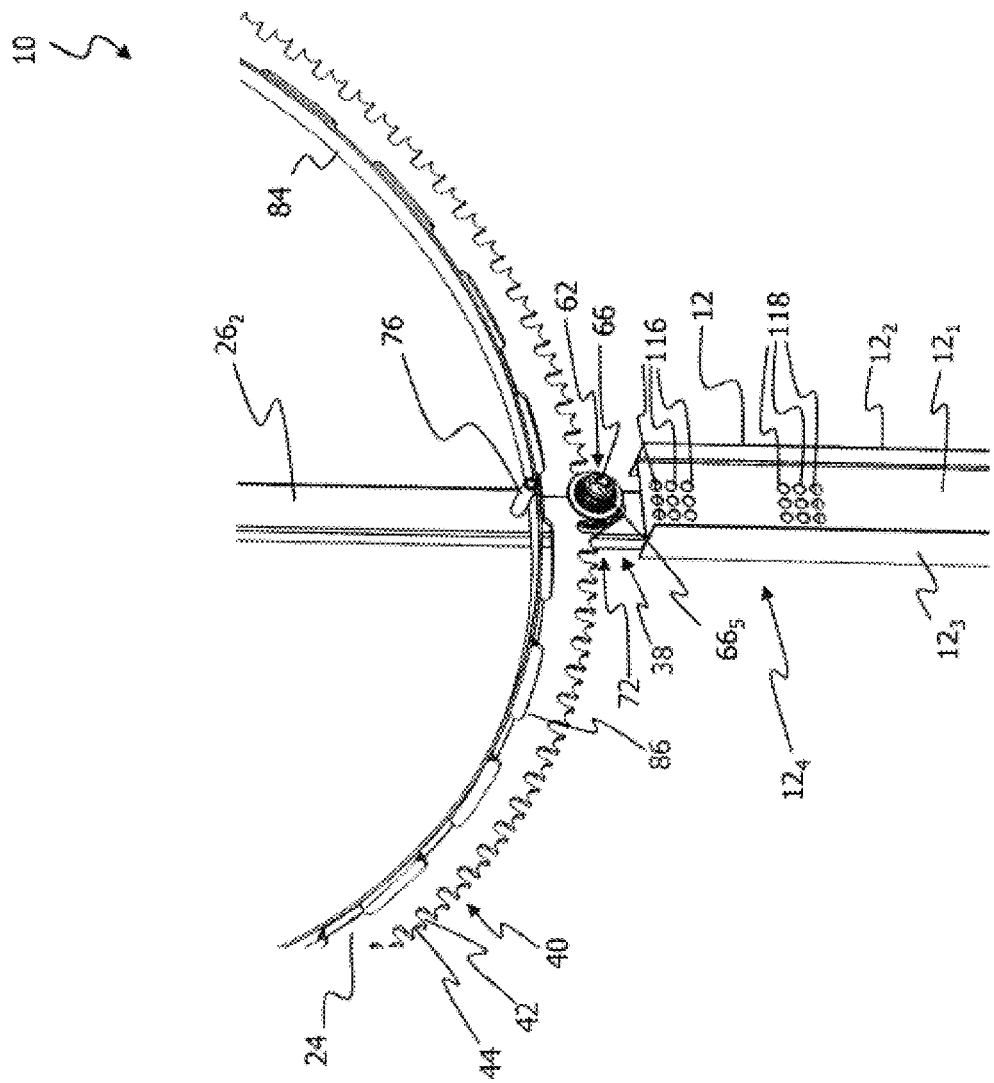

FIG. 37 shows an enlarged section of a side view, in which, in addition to the support element $26_1$, the spacer 110 has also been hidden. In FIG. 37, the openings 116 and 118 on the cross leg $12_1$ of the post 12 can be seen. The openings 116 and 118 are formed in an end portion $12_4$ of the post 12, which is used for connection to the pivot unit 10. The end portion $12_4$ forms a connecting portion for connection to the support elements $26_1$ and $26_2$. The end portion $12_4$ of the post 12 is connected to the end 32 forming a connecting portion (not shown in FIG. 37, see FIGS. 34 and 35) of the support elements $26_1$ and $26_2$. For reasons of clarity, only three openings 116 and 118 are designated. The openings 116 and 118 are offset from one another in the vertical direction. The connecting elements 112 and 114 shown in FIG. 36 may be inserted into one or more of the openings 116, 118 in order to create a connection between the support elements $26_1$ (not shown in FIG. 37) and $26_2$, the spacers 110 (not shown FIG. 37) and the post 12. A plurality of openings 116, 118 are available for establishing the connection between the post 12 and the support elements $26_1$ (not shown) and $26_2$. By suitably selecting the openings 116, 118 that are to be used to establish a connection between the support elements $26_1$ (not shown in FIG. 37) and $26_2$ and the post 12, offsets in the horizontal direction and the vertical direction may be compensated for. Such offsets may occur, in particular, when a pivot unit 10 is connected to a further pivot unit (see FIG. 1) or to a drive in the case of assembly tolerances and unevenness in the terrain, or when adjacent posts or pivot units are not in alignment.

FIG. 37 also shows the coupling portion 66 of the coupling element 62. The coupling portion 66 has a recess $66_5$ that has a hexagonal cross section. An adapter or, directly, a drive shaft (see FIG. 1) comprising a portion or projection having a hexagonal cross section may be inserted into the recess $66_5$ of the coupling portion 66 and drive the drive device 38. The same applies to the coupling portion 68 of the coupling element 64 not shown in FIG. 37 (see FIG. 42).

Figure 38:
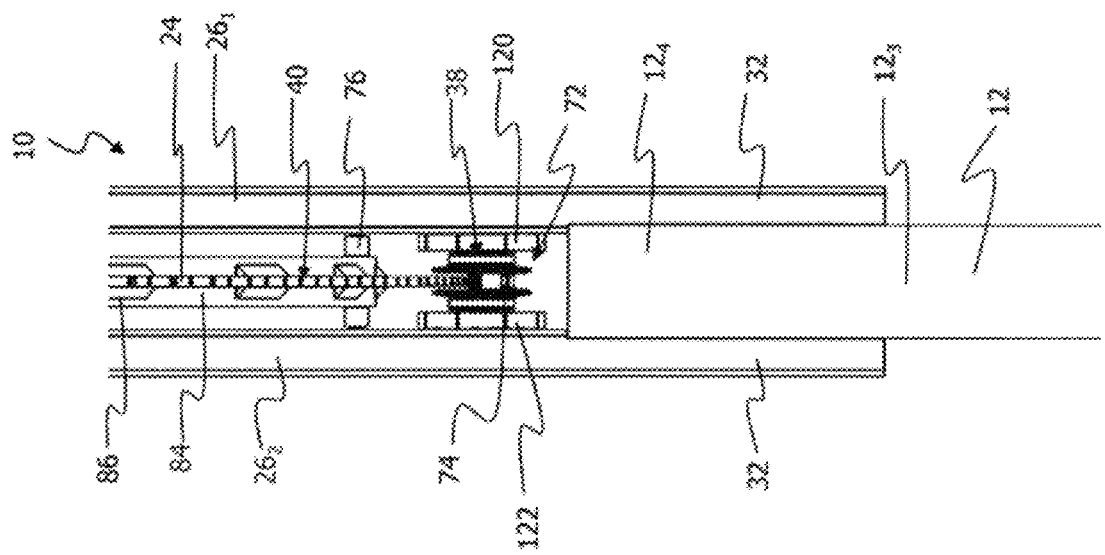
FIGS. 38 to 41 show different side views of the pivot unit according to the third embodiment of the invention in a state attached to a post.

FIG. 38 shows a section of a side view of the pivot unit 10 in a state attached to a post 12. The post 12 has an H-shaped cross section. The drive device 38 extends between the two support elements $26_1$ and $26_2$. The support elements $26_1$ and $26_2$ each have a bearing point 120 and 122 on which the drive device 38 is mounted with its bearing portions not shown in FIG. 38. The bearing points 120 and 122 are designed in the form of bearing flanges that are connected to the support elements $26_1$ and $26_2$. The bearing flanges or the bearing points 120 and 122 accommodate the bearing portions (not shown) of the drive device 38 in sections. The bearing points 120 and 122 may comprise plain bearings.

Figure 39:
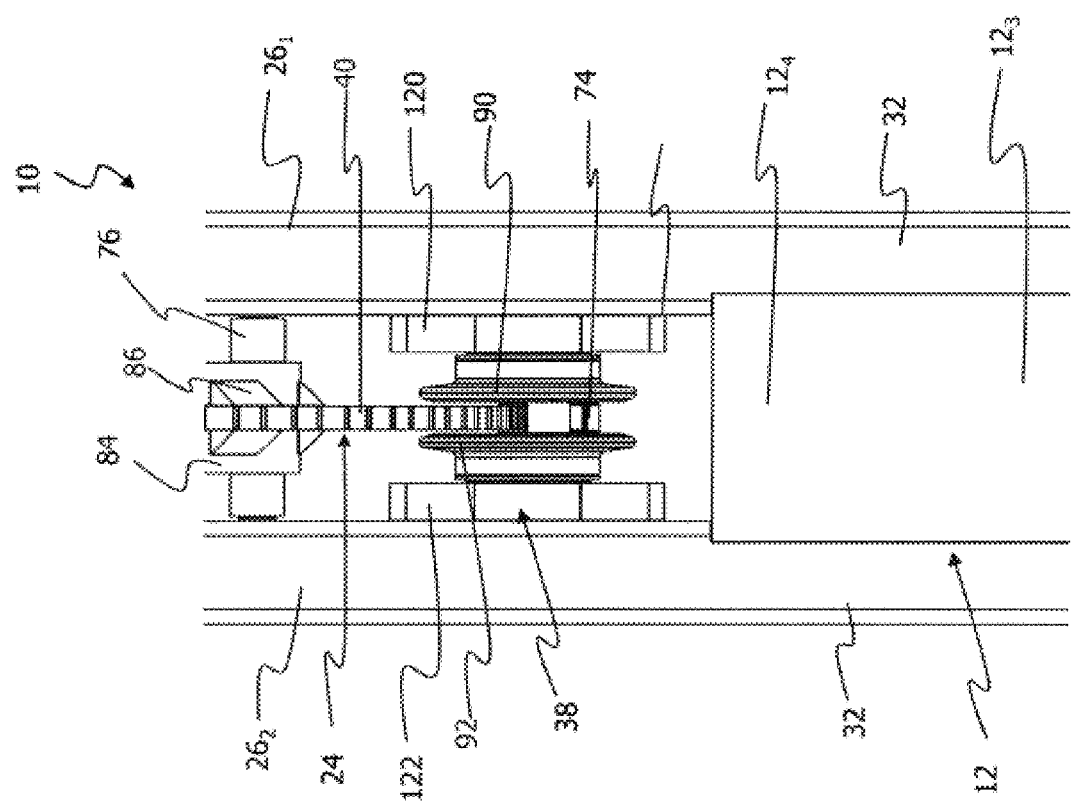

FIG. 39 shows an enlarged section of the view according to FIG. 38. The drive device 38 is mounted with its bearing portions, not shown in FIG. 39, in the bearing points 120, 122 on the support elements $26_1$ and $26_2$. The drive arc 24 likewise runs between the two support elements $26_1$ and $26_2$. The drive arc 24 may be supported on the guide element 76 via its base section 84, which guide element is designed in the form of a radial stop having a circular cross section. In particular, the drive contour 40 of the drive arc 24 runs between the two connecting elements 90 and 92 of the drive device 38. The drive element 74 and the retaining element 94, which cannot be seen in FIG. 39, also extend between the connecting elements 90 and 92. The retaining element 94, which cannot be seen in FIG. 39, is in the position of the drive device 38 shown in FIG. 39 in engagement with the drive contour 40 and in particular in engagement with a retaining recess 44 (see FIG. 37). In FIGS. 38 and 39, the post 12 is located substantially in the middle between the two support elements $26_1$ and $26_2$.

Figure 40:
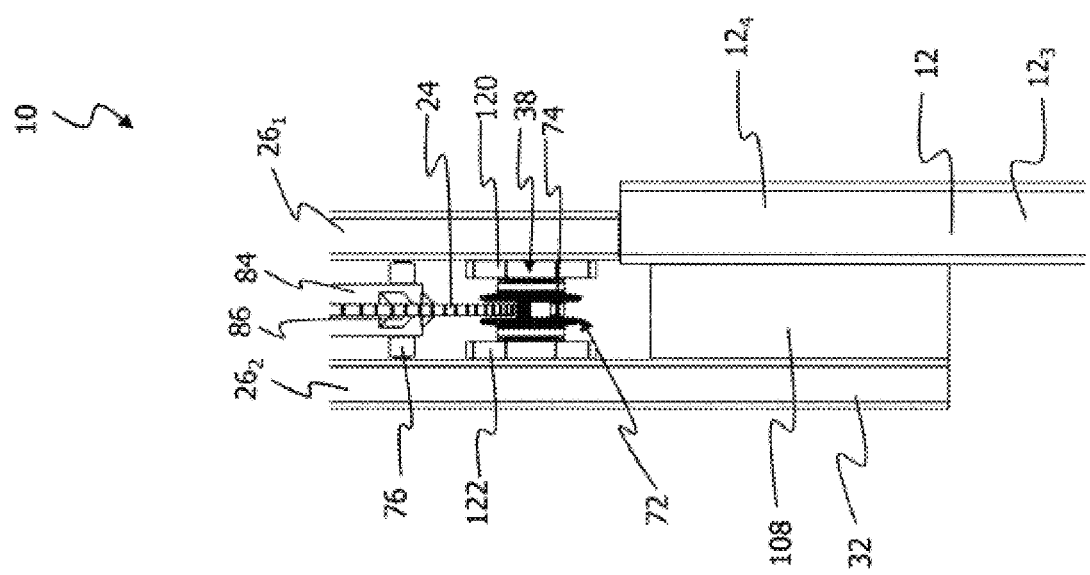

FIG. 40 shows a section of a side view of the pivot unit 10 in a state attached to the post 12. In contrast to FIGS. 38 and 39, the post 12 has a C-shaped cross section in this case. The support element $26_2$ is supported on the post 12 via a spacer 108, the lateral leg $12_3$ of the C-shaped post 12 being visible in FIG. 40. The end 32 (not visible) of the support element $26_1$ is accommodated in the C-profile of the post 12 and, like the support element $26_2$, connected to the end portion $12_4$ of the post 12.

Figure 41:
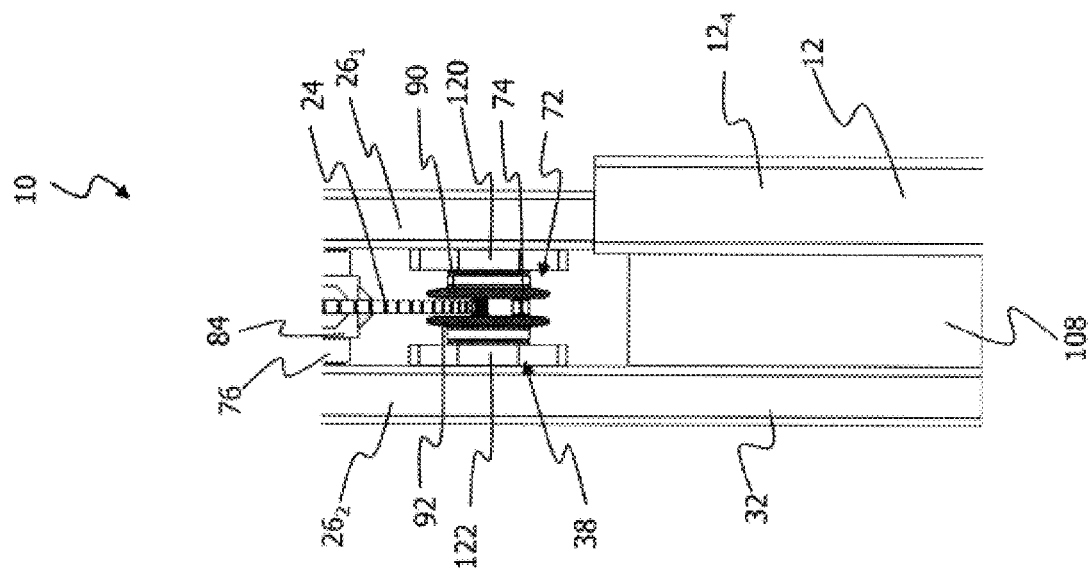

FIG. 41 shows an enlarged section of the view according to FIG. 40. The support element $26_2$ is supported on the post 12 via the spacer 108. The support element $26_1$, the spacer 108 and the support element $26_2$ are connected to one another and to the post 12 by means of connecting elements (not shown in FIG. 41).

Furthermore, FIG. 41 shows the bearing points 120 and 122 provided on the support elements $26_1$ and $26_2$, on which bearing points the drive device 38 is mounted. The drive unit 38 extends between the support elements $26_1$ and $26_2$ and is accommodated in the bearing projections 120, 122 with its bearing portions (not shown).

Figure 42:
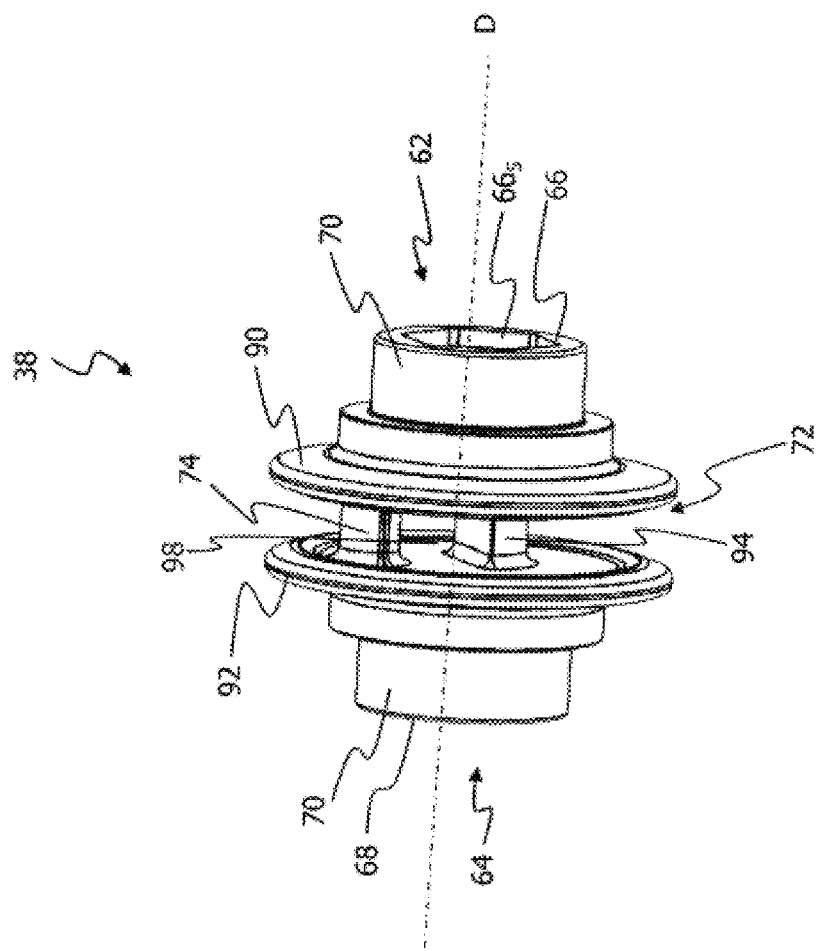
FIG. 42 shows a perspective view of the drive device according to the third embodiment of the invention.

FIG. 42 shows a perspective view of the drive device 38. The drive device 38 comprises coupling elements 62 and 64, between which a drive portion 72 is arranged. The connecting elements 90 and 92 connect the coupling elements 62 and 64 to the drive element 74 and the retaining element 94. The drive element 74 and the retaining element 94 extend between the connecting elements 90 and 92 and are spaced apart from one another by the clearance 98.

The coupling elements 62 and 64 each comprise a bearing portion 70 with which the drive device 38 may be accommodated in the bearing points 120 and 122 (see FIGS. 38 to 41). The coupling portion 66 may be seen on the coupling element 62 radially inward of the bearing portions 70. The coupling portion 66 comprises a recess 66₅. The recess 66₅ has a hexagonal cross section. A hexagonal projection of a drive shaft 14, an adapter or a drive may be inserted into the coupling portion 66 in order to couple the drive device 38 to a drive in a torque-transmitting manner (see FIGS. 1 and 2). The coupling element 64 also has such a coupling portion 68 having a recess, which, however, is not shown in FIG. 42.

The function of the pivot unit 10 is explained below. The pivot unit 10 may be driven via a drive shaft 14 shown in FIG. 1 or a drive. For this purpose, the drive shaft 14 may be coupled to the drive device 38 via one of the coupling elements 62 or 64 in a torque-transmitting manner. The drive device 38 is mounted rotatably about the rotation axis D (see FIGS. 9, 11, 15, 16, 24, 26 to 28, 31, 32 and 42) in the fastening elements 34 and 36 or in the bearing points 120 and 122. The rotation axis D of the drive device 38 extends substantially parallel to the pivot axis S. A drive shaft 14 connected to the drive device 38 may also extend substantially parallel to the pivot axis S.

The drive torque transmitted to the drive device 38 via one of the coupling elements 62 and 64 puts the drive device 38 into rotation. The drive element 74 thereby rotates on a circular path at a predetermined radial distance about the rotation axis D. The drive device 38 is coupled via its drive element 74 to the drive arc 24 in a torque-transmitting manner such that the drive arc 24 may be rotated stepwise about the pivot axis S due to a rotary movement of the drive device 38 about the rotation axis D. The drive element 74 may engage in one of the drive recesses 42 through the rotary movement carried out by the drive device 38, take the drive arc 24 with it and leave the corresponding drive recess 42 again. In this way, an adjustment step about the pivot axis S is carried out and the drive arc 24 having the cross member 22 attached thereto is transferred into a new pivot position. Between engaging in the drive recess 42 and leaving the drive recess 42, the drive element 74 presses against a flank of the drive recess 42. As a result, a torque is transmitted to the drive arc 24 such that the adjustment step of the drive arc 24 and the cross member 22 about the pivot axis S is carried out.

Due to the movement of the drive element 74 and the drive arc 24, the retaining element 94 of the drive device 38 engages with a retaining recess 44. The retaining element 94 engages in a retaining recess 44 adjacent to the drive recess 42, which has just left the drive element 74. The retaining element 94 may rotate in the corresponding retaining recess 44. The retaining element 94 engages with a first portion of its cross section in the retaining recess 44, said portion increasing in size continuously due to the rotary movement of the drive device 38 having the retaining element 94. The engagement of the retaining element 94 in the retaining recess 44 prevents rotation or pivoting of the cross member 22 and the drive arc 24 attached thereto about the pivot axis S. The drive device 38 and the drive arc 24 are thus in a locked position. If the drive device 38 is driven further in this state, the retaining element 94 leaves the retaining recess 44 again and releases the drive arc 24 for an adjustment step initiated by the drive element 74.

When it is in engagement with a retaining recess 44, the retaining element 94 may prevent a relative rotation between the drive arc 24 and the cross member 22 connected thereto and the respective support element 26, 26₁, 26₂ in a state attached to at least one post 12. As soon as the retaining element 94 also engages with a (partial) portion in a retaining recess 44, rotation of the drive arc 24 about the pivot axis S is prevented, that is to say, complete accommodation of the cross section of the retaining element 94 in a retaining recess 44 is therefore not necessary to prevent rotation of the drive arc 24. Due to the alternating arrangement of the drive recesses 42 and the retaining recess 44, an adjustment step of the drive arc 24 initiated by the drive element 74 or a retaining step, in which the drive arc 24 may be held in a locked position via the retaining element 94, may alternately be carried out. The retaining element 94 may prevent an undesired adjustment of the pivot unit 10 about the pivot axis S without a torsional moment being transmitted to the drive shaft 14 and/or the drive.

However, if the drive arc 24 and the cross member 22 connected thereto are to be pivoted further, the drive device 38 is driven further until the drive element 74 engages in the next drive recess 42 and a further adjustment step is carried out. If the drive arc 24 and the associated cross member 22 are to be locked in the set position, the drive device 38 is stopped in the locked position. In this position, the retaining element 94 is at least in part engaged with a retaining recess 44.

The connecting elements 90 and 92 form a guide for the drive arc 24 in the direction of the rotation axis D or the pivot axis S, which extend parallel to one another. For this purpose, the connecting elements 90 and 92 enclose the drive arc 24 between them. Because of the connecting elements 90 and 92, the drive arc 24 cannot evade the drive element 74 and also the retaining element 94 in the axial direction. The drive arc 24 is thus held in engagement with the drive element 74 and the retaining element 94 by the connecting elements 90 and 92. The structure of the pivot unit 10 can be considerably simplified by the guide function provided by the connecting elements 90 and 92.

The pivot unit 10 may also considerably simplify the assembly of a tracking apparatus NV. The pivot unit 10 may be preassembled. The preassembled pivot unit 10 may then be connected as an independent unit to posts 12 already anchored in the ground. The posts 12 are connected to the end 32 of the respective support element 26, 26₁, 26₂. This completes the assembly of the pivot unit 10 on the post 12. If a plurality of pivot units 10 (see FIG. 1) are to be provided, these pivot units 10 are brought into alignment with one another according to the pivot axis S and connected to one another via the drive shafts 14 and the frame elements or mounting rails 16 and 18. Each coupling element 62 and 64 of the drive device 38 may be connected via a drive shaft 14 to a further pivot unit 10 or a drive or a motor. The ends of the drive shafts 14 or corresponding adapters and/or the coupling elements of the drive device 38 are designed such that both misalignments between the drive device 38 and the drive shaft 14 and distance tolerances between the drive device 38 in the direction of the pivot axis S may be compensated for.

The invention claimed is:
1. A drive arrangement, comprising:
   at least one drive device, which is rotatable about a rotation axis, comprises at least one drive element and at least one retaining element, the at least one drive element being arranged offset in the radial direction in relation to the at least one retaining element, the at least one drive element comprising a longitudinal axis that extends parallel and offset in the radial direction to the rotation axis of the at least one drive device;
   at least one output unit, which is rotatable or pivotable about an axis, the output unit comprising at least one drive recess and at least one retaining recess;

wherein the at least one drive element being associated with the at least one drive recess and engaging in the at least one drive recess in order to drive the output unit;

wherein the at least one retaining element being associated with the at least one retaining recess and engaging in the at least one retaining recess in order to hold the output unit in a set position;

wherein the at least one drive element having a cross section that is different from a circular cross section and that is curved at least in some sections, the drive arrangement comprising at least one selected from the group consisting of (1) the at least one drive element having a cross section reduced in the radial direction with respect to the rotation axis compared to a circular cross section and (2) the at least one drive recess widening in the radial direction in order to define an entry opening for the at least one drive element; and wherein the rotation axis of the at least one drive device runs through the at least one retaining element.

2. The drive arrangement according to claim 1, wherein (1) the cross section of the at least one drive element comprises at least one first apex and at least one second apex, the distance between which defines the greatest extent of the drive element, or (2) the cross section of the at least one drive element comprises at least one first edge and at least one second edge, the distance between which defines the greatest extent of the drive element.

3. The drive arrangement according to claim 2, wherein the cross section of the at least one drive element has at least one third apex and one fourth apex, the distance between which is smaller than the distance between the first apex and the second apex or between the first edge and the second edge.

4. The drive arrangement according to claim 3, wherein the at least one drive recess widens outward or inward in the radial direction in order to define the entry opening for the at least one drive element.

5. The drive arrangement according to claim 3, wherein the at least one retaining element has at least in one portion a curvature that is matched to the curvature of the at least one retaining recess.

6. The drive arrangement according to claim 2, wherein the at least one drive recess widens outward or inward in the radial direction in order to define the entry opening for the at least one drive element.

7. The drive arrangement according to claim 2, wherein the at least one retaining element has at least in one portion a curvature that is matched to the curvature of the at least one retaining recess.

8. The drive arrangement according to claim 2, wherein the at least one drive element and the at least one retaining element are connected to one another via at least one connecting element.

9. The drive arrangement according to claim 2, wherein the at least one drive element and the at least one retaining element extend substantially parallel to the rotation axis of the drive device.

10. The drive arrangement according to claim 1, wherein the at least one drive recess widens outward or inward in the radial direction in order to define the entry opening for the at least one drive element.

11. The drive arrangement according to claim 10, wherein the at least one retaining element has at least in one portion a curvature that is matched to the curvature of the at least one retaining recess.

12. The drive arrangement according to claim 1, wherein the at least one retaining element has at least in one portion a curvature that is matched to the curvature of the at least one retaining recess.

13. The drive arrangement according to claim 12, wherein the at least one drive recess widens outward or inward in the radial direction in order to define the entry opening for the at least one drive element.

14. The drive arrangement according to claim 1, wherein the at least one drive element and the at least one retaining element are connected to one another via at least one connecting element.

15. The drive arrangement according to claim 14, wherein the at least one retaining element has at least in one portion a curvature that is matched to the curvature of the at least one retaining recess.

16. The drive arrangement according to claim 1, wherein the at least one drive element and the at least one retaining element extend substantially parallel to the rotation axis of the drive device.

17. The drive arrangement according to claim 1, wherein the at least one drive element has an oval or elliptical or lenticular or circular cross section.

* * * * *